(12) United States Patent
Kirpalani et al.

(10) Patent No.: US 11,679,996 B2
(45) Date of Patent: Jun. 20, 2023

(54) FERRO-CAVITATION PROCESSES FOR TARGET METAL SEPARATION

(71) Applicant: National Research Council of Canada, Ottawa (CA)

(72) Inventors: Deepak M. Kirpalani, Nepean (CA); Dipti Prakash Mohapatra, Ottawa (CA)

(73) Assignee: National Research Council of Canada, Ottawa (CA)

( * ) Notice: Subject to any disclaimer, the term of this patent is extended or adjusted under 35 U.S.C. 154(b) by 0 days.

(21) Appl. No.: 17/558,788

(22) Filed: Dec. 22, 2021

(65) Prior Publication Data

US 2022/0169541 A1    Jun. 2, 2022

Related U.S. Application Data

(63) Continuation of application No. 16/334,593, filed as application No. PCT/CA2017/051106 on Sep. 20, 2017, now Pat. No. 11,306,007.
(Continued)

(51) Int. Cl.
  *C02F 1/36*    (2023.01)
  *C02F 1/52*    (2023.01)
  (Continued)

(52) U.S. Cl.
  CPC ............. *C02F 1/36* (2013.01); *C02F 1/5245* (2013.01); *C02F 1/722* (2013.01);
  (Continued)

(58) Field of Classification Search
  CPC ...... C02F 1/36; C02F 1/722; C02F 2101/106; C02F 2101/20; C02F 2305/026; C10L 2290/00; C10L 2290/54
  See application file for complete search history.

(56) References Cited

U.S. PATENT DOCUMENTS

| | | |
|---|---|---|
| 4,031,038 A | 6/1977 | Grinstead et al. |
| 5,997,812 A | 12/1999 | Burnham et al. |
| 2010/0320118 A1 | 12/2010 | Duyvesteyn |

(Continued)

FOREIGN PATENT DOCUMENTS

| | | |
|---|---|---|
| CN | 103387305 A | 11/2013 |
| CN | 203558889 U | 4/2014 |

(Continued)

OTHER PUBLICATIONS

Fu et al., Degradation of Ni-EDTA complex by Fenton reaction and ultrasonic treatment for the removal of Ni2+ ions, Environ Chem Lett, vol. No. 4, pp. 317-322, May 21, 2009.
(Continued)

*Primary Examiner* — Bradley R Spies

(57) ABSTRACT

Provided herein are processes for the removal and/or recovery of a target metal from a liquid sample, said process comprising: [1] applying acoustic cavitation to the liquid; and [2] adding an iron (II) salt, or a precursor form thereof, to the liquid sample and allowing Fenton oxidation reaction to occur between the iron and hydrogen peroxide in the liquid, thereby producing hydroxyl radicals; thereby producing a target metal salt or metal oxide having a reduced solubility in the liquid sample, leading to removal of the target metal from the liquid sample. The use of metal ligands in such processes is also described, as well as systems for performing such processes. Methods, processes, and systems for removing organic contaminants from a liquid sample are also described.

20 Claims, 11 Drawing Sheets

Related U.S. Application Data

(60) Provisional application No. 62/397,112, filed on Sep. 20, 2016.

(51) Int. Cl.

| | | |
|---|---|---|
| *C02F 1/72* | (2023.01) | |
| *C02F 101/10* | (2006.01) | |
| *C02F 101/20* | (2006.01) | |
| C02F 101/36 | (2006.01) | |
| C02F 101/38 | (2006.01) | |
| C02F 103/16 | (2006.01) | |

(52) U.S. Cl.
CPC .... *C02F 2101/106* (2013.01); *C02F 2101/20* (2013.01); *C02F 2101/36* (2013.01); *C02F 2101/38* (2013.01); *C02F 2103/16* (2013.01); *C02F 2305/026* (2013.01)

(56) References Cited

U.S. PATENT DOCUMENTS

| | | |
|---|---|---|
| 2013/0319939 A1 | 12/2013 | Bower |
| 2013/0334100 A1 | 12/2013 | Mazyar et al. |
| 2016/0082367 A1 | 3/2016 | Berger |

FOREIGN PATENT DOCUMENTS

| | | |
|---|---|---|
| CN | 10429093 | 4/2015 |
| CN | 204454826 | 7/2015 |
| CN | 104944657 | 9/2015 |
| WO | 2012025922 | 3/2012 |
| WO | 2014125130 A2 | 8/2014 |

OTHER PUBLICATIONS

Zhang et al., Application of ultrasound and Fenton's reaction process for the treatment of oily sludge, 2013 International Symposium on Environmental Science and Technology (2013 ISEST), Procedia Environmental Sciences 18, pp. 686-693, 2013.

El Shafei et al., Ultrasonic assisted-Fenton-life degradation of nitrobenzene at neutral pH using nanosized oxides of Fe and Cu, Ultrasonics Sonochemistry, 21, pp. 1358-1365, 2014.

Ramana et al., Removing selenium(IV) and arsenic(V) oxyanions with tailored chelating polymers, Journal of Environmental Engineering, American Society of Civil Engineers, US, vol. 118, No. 5, Aug. 31, 1992.

Pham, T.D., 2014, Ultrasonic and electrokinetic remediation of low permeability soil contaminated with persistent organic pollutants, Thesis for the degree of Doctor of Science (Technology), Lappeenranta University of Technology.

Alcarazo et al., Imidazo[1,5-a]pyridine: A versatile architecture for stable N-Heterocyclic carbenes, Journal of the American Chemical Society 2005 127 (10), 3290-3291.

Shrimpton, et al., Fractionation of selenium during selenate reduction by granular zerovalent iron, Environmental Science & Technology 2015 49 (19), 11688-11696.

Merrill, et al., Field evaluation of arsenic and selenium removal by iron coprecipitation, Journal (Water Pollution Control Federation), vol. 58, No. 1, 1986, pp. 18-26.

Miletic et al., Nickel(II) complexes of whole set of the simple ethylenediaminetetracarboxylate ligands: DFT study of complexes invoking molecular orbital and configurational analysis, Inorganic Chemistry Communications vol. 12, Issue 8, Aug. 2009, pp. 720-723.

Extended European Search Report from corresponding European Application No. 17852027.6 dated May 7, 2020.

International Preliminary Report on Patentability for PCT/CA2017/051106 dated Apr. 4, 2019.

International Search Report for PCT/CA2017/051106 dated Oct. 18, 2017.

Chalaturnyk, R.J., Scott, J.D., Ozum, B., 2002. Management of oil sand tailings. Petroleum Science and Technology 20, 1025-1046.

Li, Haipeng, Role of Hydrodynamic Cavitation in Fine Particle Flotation, M.Sc. thesis, 2014, University of Alberta.

Moriwaki, Hiroshi, et al., "Sonochemical decomposition of perfluorooctane sulfonate and perfluorooctanoic acid." Environmental Science and Technology 39.9 (2005): 3388-3392 (Year: 2005).

Javadli, Rashad, and Amo de Klerk "Desulfurization of heavy oil-oxidative desulfurization (ODS) as potential upgrading pathway for oil sands derived bitumen." Energy & fuels 26.1 (2012): 594-602 (Year 2012).

Lin, Jiunn Ren, and Teh Ru Yen. "An upgrading process through cavitation and surfactant." Energy & Fuels 7.1 (1993): 111-118 (Year: 1993).

FERRO-CAVITATION PROCESSES FOR TARGET METAL SEPARATION

CROSS-REFERENCE TO RELATED APPLICATIONS

This application is a continuation application of U.S. application Ser. No. 16/334,593, filed Mar. 19, 2019, and entitled "FERRO-CAVITATION PROCESSES FOR TARGET METAL SEPARATION", which claims priority to PCT Application No. PCT/CA2017/051106, having a filing date of Sep. 20, 2017, which is based on U.S. Provisional Application No. 62/397,112, having a filing date of Sep. 20, 2016. The entire contents of all priority documents are hereby incorporated by reference.

FIELD OF INVENTION

The present invention relates generally to the removal of metals from a liquid sample. More specifically, the present invention relates to metal separation processes involving Fenton oxidation and cavitation.

BACKGROUND

Industrial processes commonly utilize or produce liquids containing, or contaminated with, metals such as heavy metals, rare earth elements, and others. Removal of these metals is often desirable, as their presence may have negative toxicity, environmental, or operational impacts. Elevated metal concentrations in process-affected water, for example, can lead to various operational issues including reduced extraction recovery and/or scaling/fouling of pipes and unit operations during water re-use. Furthermore, certain of these metals may be valuable, assuming they can be extracted in a cost-effective manner.

Industrial operations in which the removal of metal from a liquid sample may be desirable are often found in, for example, the energy sector. Oil sands operations often involve process affected water, oil, bitumen, and/or asphaltene samples containing metals. Such metals may be found in, for example, water-based tailings, oil sand tailings, and froth flotation tailings. The presence of these metals may lead to reduced equipment lifespan, and/or may necessitate costly treatments to reduce toxicity and/or environmental impacts of such liquids. Furthermore, metals contained in these liquids may be rare and/or valuable, and therefore removal and collection of these metals may be desirable, assuming it can be achieved in a cost effective manner.

Previous approaches for heavy metal separation/recovery have involved the addition of peroxide to tailings, centrifugation, and co-precipitation methods. Alternative, additional, and/or improved processes for target metal separation from liquid samples is desirable.

SUMMARY OF INVENTION

It has been found herein that by combining Fenton's oxidation with cavitation, enhanced metals separation and/or recovery (and/or organic contaminant removal) from a liquid sample may be achieved. Such treatment processes combine acoustic cavitation/sonication and Fenton's oxidation, thereby allowing for efficient production of hydroxyl radicals in a liquid sample to be treated and facilitating target metal separation and recovery and/or upgrading.

In an embodiment, there is provided herein a process for removal of a target metal from a liquid sample, said process comprising:
applying acoustic cavitation to the liquid; and
adding an iron (II) salt, or a precursor form thereof, to the liquid sample and allowing Fenton oxidation reaction to occur between the iron and hydrogen peroxide in the liquid, thereby producing hydroxyl radicals;
thereby producing a target metal salt or metal oxide having a reduced solubility in the liquid sample, leading to removal of the target metal from the liquid sample.

In another embodiment of a process as described above, the process may further lead to removal of target organic compounds from the liquid sample. In yet another embodiment, the target organic compounds may comprise persistent organic polymers (POPs). In still further embodiments, the POPs may comprise perfluorooctane sulfonate (PFOS) or perfluoroheptane sulfonate (PFHpS) or other Per- and polyfluoroalkyl substances (PFAS).

In still another embodiment of the process or processes above, the acoustic cavitation may be in a range of from 20 kHz to 2.4 MHz, or from 350 kHz to 800 kHz. In yet another embodiment, the acoustic cavitation may be in a range of from 500-600 kHz.

In another embodiment of the process or processes above, the liquid sample may be or comprise a process affected water, an oil, a bitumen, or an asphaltenes. In certain embodiments, the process affected water may be a water-based tailings or effluent. In certain embodiments, the liquid sample may comprise metallurgical coal effluent, or precious metal effluent. In other embodiments, the liquid sample may be or comprise oil sand tailings or froth floatation tailings.

In another embodiment of the process or processes above, the target metal may be nickel (Ni), vanadium (V), or selenium (Se).

In another embodiment of the process or processes above, the iron (II) salt may be $FeSO_4$.

In yet another embodiment of the process or processes above, the target metal removed from the liquid sample may be recovered.

In still another embodiment of the process or processes above, the target metal salt or metal oxide having reduced solubility in the liquid sample may be precipitated from the liquid sample and removed therefrom.

In still another embodiment of the process or processes above, the process may further comprise a step of:
adding a ligand for the target metal to the liquid sample.

In yet another embodiment of the process above, the ligand may complex with the target metal, thereby further reducing solubility of the metal in the liquid sample, facilitating removal therefrom. In certain embodiments, complexation of the ligand with the metal may result in precipitation of the metal from the liquid sample.

In certain embodiments of the process or processes above, the ligand may be EDTA, 2-(aminomethyl)pyridine:

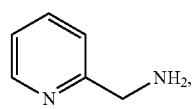

or a combination thereof.

In another embodiment of the process or processes above, the ligand may be 2-(aminomethyl)pyridine, and the target metal may be selenium. In certain embodiments, the selenium may complex with the ligand to form at least one complex having the structure:

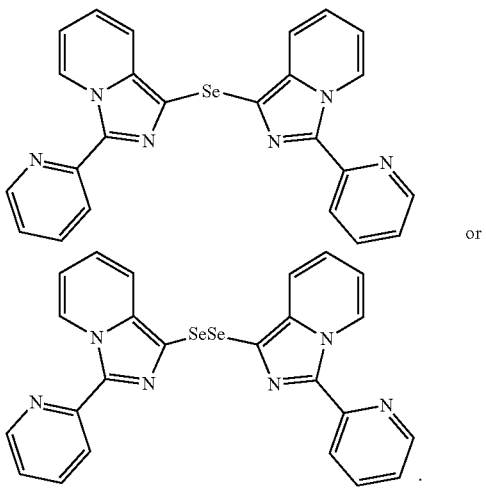

or

In another embodiment of the process or processes above, no additional hydrogen peroxide may be added to the liquid as part of the process.

In another embodiment of the process or processes above, the hydrogen peroxide may be generated in the liquid sample when acoustic cavitation is applied thereto.

In another embodiment, there is provided herein a system for removing a target metal from a liquid sample, said system comprising:
  a vessel for containing and, optionally, mixing the liquid sample;
  an acoustic cavitation module for applying acoustic cavitation to the liquid in the vessel;
  an input for adding an iron (II) salt, or a precursor form thereof, to the liquid sample in the vessel such that Fenton oxidation reaction between the iron and hydrogen peroxide in the liquid occurs, thereby producing hydroxyl radicals; and
  optionally, an output for removing produced target metal salt or metal oxide having a reduced solubility in the liquid sample from the liquid sample.

In yet another embodiment of the system above, the acoustic cavitation module may apply acoustic cavitation in a range of from 20 kHz to 2.4 MHz, or from 350 kHz to 800 kHz. In still another embodiment, the acoustic cavitation module may apply acoustic cavitation in a range of from 500-600 kHz.

In another embodiment of the system or systems above, the liquid sample may be or comprise a process affected water, an oil, a bitumen, or an asphaltenes. In still another embodiment, the process affected water may be a water-based tailings or effluent. In certain embodiments, the liquid sample may comprise metallurgical coal effluent, or precious metal effluent. In yet another embodiment, the liquid sample may be or comprise oil sand tailings or froth floatation tailings.

In another embodiment of the system or systems above, the target metal may be nickel (Ni), vanadium (V), or selenium (Se).

In yet another embodiment of the system or systems above, the iron (II) salt may be $FeSO_4$.

In another embodiment of the system or systems above, the output may be for removing the target metal salt or metal oxide having reduced solubility in the liquid sample as a precipitate.

In still another embodiment of the system or systems above, the system may further comprise a second input for adding a ligand for the target metal to the liquid sample in the vessel. In an alternative embodiment, the input for adding an iron (II) salt, or a precursor form thereof, to the liquid sample may also be for adding a ligand for the target metal to the liquid sample in the vessel.

In yet another embodiment of the system above, the ligand may be a ligand which complexes with the target metal, thereby further reducing solubility of the metal in the liquid sample.

In certain embodiments of the system above, the ligand may be EDTA, 2-(aminomethyl)pyridine:

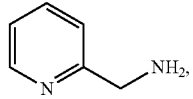

or a combination thereof.

In another embodiment of the system or systems above, the ligand may be 2-(aminomethyl)pyridine and the target metal may be selenium. In certain further embodiments, the ligand may be for complexing with the selenium to form at least one complex having the structure:

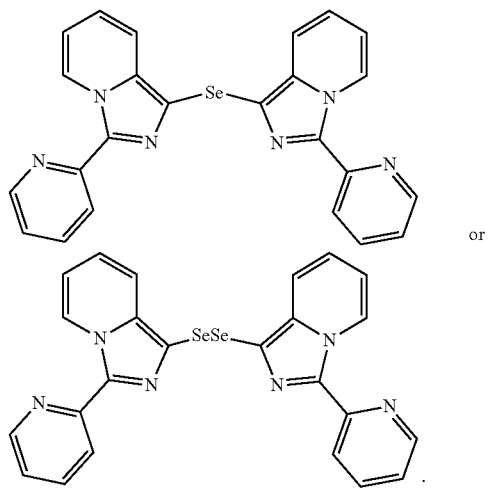

or

In yet other embodiment of the system or systems above, the system may not add additional hydrogen peroxide to the liquid.

In still another embodiment of the system or systems above, the system may generate hydrogen peroxide in the liquid sample when acoustic cavitation is applied thereto.

In another embodiment, there is provided herein a process for upgrading bitumen, said process comprising:
  applying acoustic cavitation to the bitumen; and
  adding an iron (II) salt, or a precursor form thereof, to the bitumen and allowing Fenton oxidation reaction to occur between the iron and hydrogen peroxide in the bitumen, thereby producing hydroxyl radicals.

In another embodiment of the above process, upgrading bitumen may comprise reducing viscosity; reducing target metal content; asphaltene separation; disintegration or solubilisation of asphaltene flocs; reducing persistent organic polymers (POPs) content; or any combination thereof.

In still another embodiment of the above process or processes, the target metal may comprise Selenium.

In yet another embodiment of the above process or processes, the POPs may comprise perfluorooctane sulfonate (PFOS) or perfluoroheptane sulfonate (PFHpS).

In still another embodiment of the above process or processes, the acoustic cavitation may be in a range of from 20 kHz to 2.4 MHz, or from 350 kHz to 800 kHz. In certain embodiments, the acoustic cavitation may be in a range of from 350-600 kHz.

In yet another embodiment of the above process or processes, the iron (II) salt may be $FeSO_4$.

In another embodiment of the above process or processes, the process may further comprise a step of:
adding a ligand for the target metal to the bitumen.

In yet another embodiment of the above process or processes, the ligand may complex with the target metal, facilitating removal therefrom. In certain embodiments, the ligand may comprise EDTA. In another embodiment of the above process or processes, the ligand may comprise 2-(aminomethyl)pyridine:

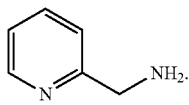

In yet another embodiment of the above process or processes, the target metal may be selenium. In still another embodiment, the selenium may complex with the ligand to form at least one complex having the structure:

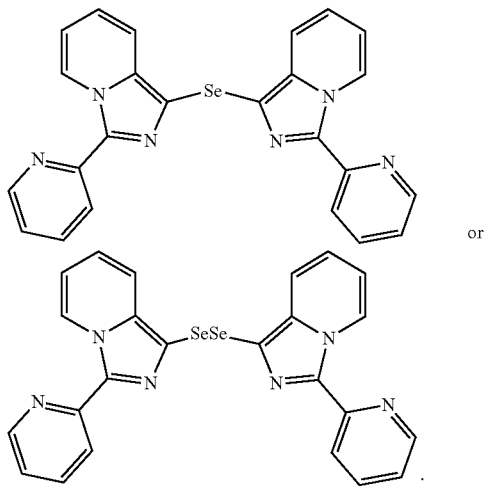

In yet another embodiment of the above process or processes, the process may involve no additional hydrogen peroxide being added to the liquid as part of the process.

In still another embodiment of the above process or processes, the hydrogen peroxide may be generated in the liquid sample when acoustic cavitation is applied thereto.

In still another embodiment, there is provided herein a system for performing a process for upgrading bitumen as described hereinabove, said system comprising:

a vessel for containing and, optionally, mixing the bitumen;
an acoustic cavitation module for applying acoustic cavitation to the bitumen in the vessel; and
an input for adding an iron (II) salt, or a precursor form thereof, to the bitumen in the vessel such that Fenton oxidation reaction between the iron and hydrogen peroxide in the bitumen occurs, thereby producing hydroxyl radicals.

In yet another embodiment, there is provided herein a process for removal of an organic contaminant from a liquid sample, said process comprising:
applying acoustic cavitation to the liquid sample; and
adding an iron (II) salt, or a precursor form thereof, to the liquid sample and allowing Fenton oxidation reaction to occur between the iron and hydrogen peroxide in the liquid sample, thereby producing hydroxyl radicals.

In yet another embodiment of the above process, the process may further lead to removal of a target metal from the liquid sample.

In yet another embodiment of the above process or processes, the organic contaminant may comprise a persistent organic polymer (POP). In yet another embodiment, the POP may comprise perfluorooctane sulfonate (PFOS) or perfluoroheptane sulfonate (PFHpS).

In yet another embodiment of the above process or processes, the acoustic cavitation may be in a range of from 20 kHz to 2.4 MHz, for example from 20 kHz to 800 KHz, or from 20 kHz to 200 kHz, or from 350 kHz to 800 kHz.

In certain embodiments, e.g. for organic (i.e. POP) removal, the acoustic cavitation may be in a range of from 20-40 kHz as they are higher molecular weight compounds. In other embodiments, a range of from about 20-800 KHz may be preferred, in particular for PFAS substances with lower chain length which may need higher frequencies.

In yet another embodiment of the above process or processes, the liquid sample may be or comprise a process affected water, an oil, a bitumen, or an asphaltenes.

In yet another embodiment of the above process or processes, the process affected water may be a water-based tailings or effluent or metallurgical coal effluent or precious metal effluent.

In yet another embodiment of the above process or processes, the liquid sample may be or comprise oil sand tailings or froth floatation tailings.

In still another embodiment of the above process or processes, the target metal may be nickel (Ni), vanadium (V), or selenium (Se).

In another embodiment of the above process or processes, the iron (II) salt may be or comprise $FeSO_4$.

In yet another embodiment of the above process or processes, the process may further comprise a step of:
adding a ligand for the target metal to the liquid sample.

In certain embodiments, the ligand may comprise EDTA. In certain embodiments, the ligand may comprise 2-(aminomethyl)pyridine:

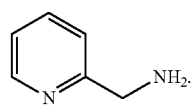

In yet another embodiment of the above process or processes, the target metal may comprise selenium. In yet another embodiment, selenium may complex with the ligand to form at least one complex having the structure:

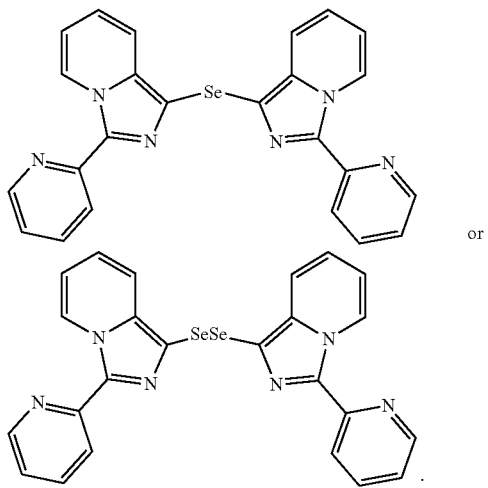

or

In yet another embodiment of the above process or processes, no additional hydrogen peroxide may be added to the liquid as part of the process.

In yet another embodiment of the above process or processes, the hydrogen peroxide may be generated in the liquid sample when acoustic cavitation is applied thereto.

In another embodiment, there is provided herein a system for performing a process for removal of an organic contaminant from a liquid sample, said system comprising:
  a vessel for containing and, optionally, mixing the liquid sample;
  an acoustic cavitation module for applying acoustic cavitation to the liquid sample; and
  an input for adding an iron (II) salt, or a precursor form thereof, to the liquid sample such that Fenton oxidation reaction between the iron and hydrogen peroxide in the bitumen occurs, thereby producing hydroxyl radicals.

DETAILED DESCRIPTION

Figure 1:
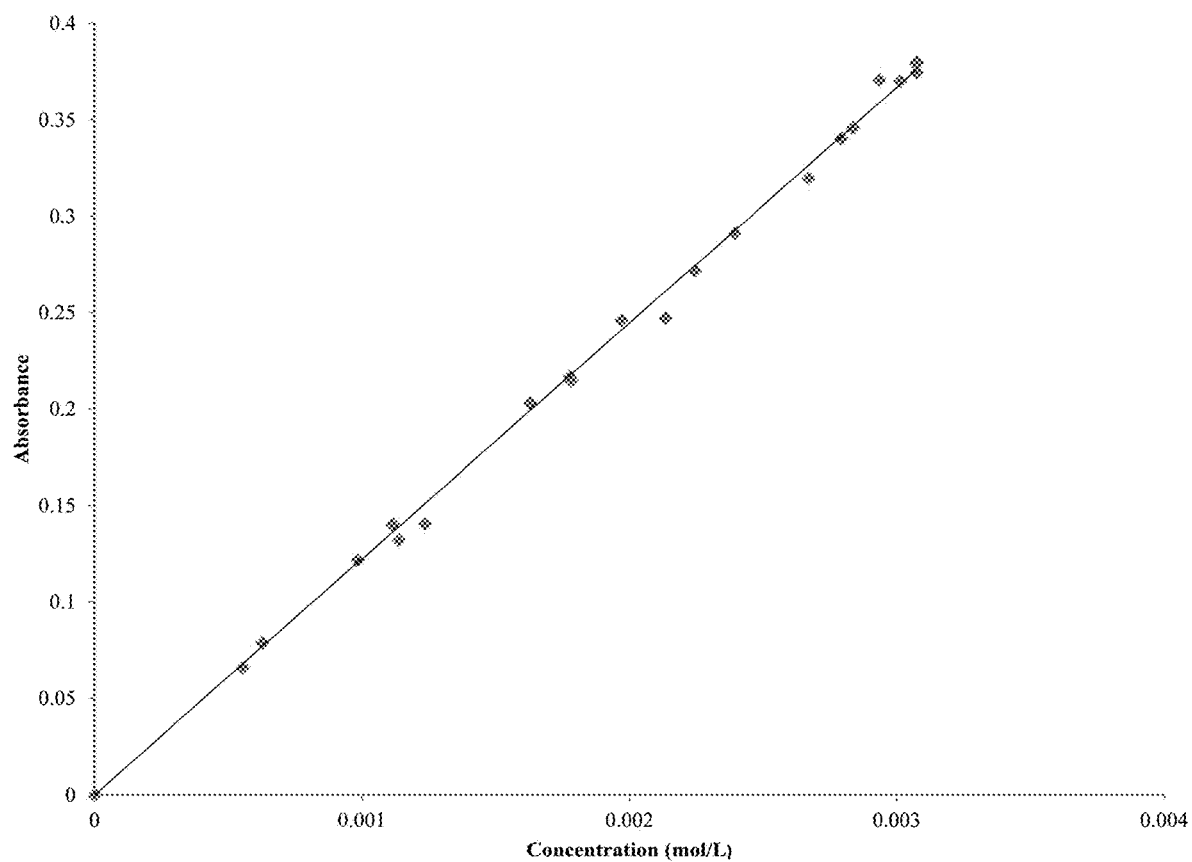
FIG. 1 shows an iodine calibration curve obtained using a UV-Vis spectrophotometer.

Described herein are metal or other contaminant separation processes and systems involving Fenton's oxidation and cavitation. It will be appreciated that embodiments and examples are provided for illustrative purposes intended for those skilled in the art, and are not meant to be limiting in any way.

In certain embodiments, there is provided herein a process for the removal and/or separation of a target metal from a liquid sample, said process comprising:
  applying acoustic cavitation to the liquid; and
  adding an iron (II) salt, or a precursor form thereof, to the liquid sample and allowing Fenton oxidation reaction to occur between the iron and hydrogen peroxide in the liquid, thereby producing hydroxyl radicals and/or other oxygen radicals;
thereby producing a target metal salt or metal oxide having a reduced solubility in the liquid sample, leading to/allowing for removal of the target metal from the liquid sample. Such processes are also referred to herein as ferro-cavitation processes.

As will be understood, the hydrogen peroxide in the liquid may be hydrogen peroxide which is sonochemically generated in situ in the liquid during the process, and may comprise hydrogen peroxide itself, other precursor or related hydroxyl (OH) radicals, or a mixture thereof. Without wishing to be bound by theory, production of hydrogen peroxide during cavitation of aqueous or water-containing solutions may be initiated by thermolysis of water as shown in (1) immediately below, producing hydroxyl radicals (OH.) which may self-react to form hydrogen peroxide in the medium as shown in (2) immediately below. Again without wishing to be bound by theory, recombination of hydroxyl radicals (OH.) to form hydrogen peroxide most likely occurs at the collapsing bubble interface.

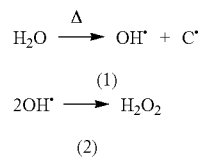

The person of skill in the art having regard to the teachings herein will understand that removal or separation of a target metal from a liquid sample may refer to any reduction in total concentration of the target metal present in the liquid in any form (including both elemental and salt form(s)). The reduction may be as a result of, for example, precipitation, phase separation, or other physical removal of the target metal from the liquid. The target metal may be separated alone, or in the form of a co-precipitant, or both, for example. The target metal may be removed in elemental form, or as a salt or chelate, or any combination thereof. The target metal may be removed in the form of an oxide, salt, or uncharged metal species, or any combination thereof, for example.

The liquid sample may be any suitable aqueous or oil-based sample to be treated. Typically, liquid samples are in liquid (or substantially liquid) phase under conditions encountered in the processes described herein (or may be made to be in liquid phase through heating or dilution, for example), and may be either aqueous (i.e. a process affected water sample, a water-based tailings or effluent sample, or an oil sand tailings, fine tailings, or froth floatation tailings sample) or oil-based (i.e. an oil sample, a bitumen sample, a fine tailings sample, or an asphaltenes sample). Suitable liquid samples may contain at least one target metal to be removed/separated and/or recovered The target metal may be any suitable target metal or ion for which removal and/or recovery from the liquid sample may be desirable. Although the term metal has been used herein, the skilled person will understand that metals may include, as well as suitable classical metals, certain nonmetals, metalloids, transition metals, rare-earth metals, and other suitable elements. Examples of target metals referred to herein may include nickel (Ni), vanadium (V), selenium (Se), titanium (Ti), cerium (Ce), gadolinium (Gd), praseodymium (Pr), europium (Eu), samarium (Sm), dysprosium (Dy), holmium (Ho), lutetium (Lu), ytterbium (Yb), hafnium (Hf), tantalum (Ta), terbium (Tb), thulium (Tm), erbium (Er), or any salt, ionic species, chelate, or combination thereof, or any other suitable metal.

As will also be understood, the iron (II) salt, or precursor form thereof, may be any suitable reagent which provides iron (II) (i.e. ferrous iron; $Fe^{2+}$) species to the liquid sample. An iron (II) salt may include, for example, iron (II) sulphate ($FeSO_4$). An iron (II) salt precursor may include, for example, any suitable iron (III) species which is readily reduced in the liquid sample to provide iron (II).

Fenton's oxidation generally involves hydrogen peroxide and a ferrous iron (iron (II)) catalyst. Fenton's oxidation has been used in the art to oxidize contaminants in wastewater, for example. Without wishing to be bound by theory, Fenton's oxidation as referred to herein generally involves oxidation of iron II ($Fe^{2+}$) by hydrogen peroxide to Iron III ($Fe^{3+}$), producing a hydroxyl radical. Other radicals may also be formed. Iron III ($Fe^{3+}$) may then be reduced back to iron II ($Fe^{2+}$). Overall, Fenton's oxidation may be viewed as involving the disproportionation of hydrogen peroxide, generating HO. and HOO. radicals, which may be useful for metals separation/recovery as described in detail herein.

Without wishing to be bound by theory, ferro-cavitation processes as described herein may involve one or more of the following reactions:

  (1)

  (2)

  (3)

  (4)

  (5)

As part of certain recovery/separation process embodiments as described herein, iron (II) added to the liquid sample may react with hydrogen peroxide generated during the ferro-cavitation process, thereby producing hydroxy radicals and/or other oxygen radicals (i.e. HOO. radicals). In certain embodiments, these radicals may be produced sonochemically, for example. Hydroxy radicals and/or other oxygen radicals (i.e. HOO radicals), newly formed in the liquid sample, may interact with the target metal to produce a target metal salt, target metal oxide, target metal chelate, or other target metal form having a reduced solubility in the liquid sample (or another chemical property change allowing for at least partial removal and/or separation of the metal from the liquid sample). Although reduced solubility, potentially leading to precipitation, is commonly described herein, it will be understood that changes to other chemical properties of the target metal, allowing for separation from the liquid sample, are also contemplated herein.

By way of non-limiting example, exposure of the target metal to the process conditions described herein may result in the target metal interacting with hydroxyl radicals to form target metal salts and/or target metal ionic species which precipitate or otherwise separate from the primary phase of the liquid sample. Further, it is also contemplated that the target metal might at least partially co-precipitate with iron, might be converted to uncharged or elemental form having decreased solubility, and/or might be oxidized so as to have reduced solubility in the liquid sample, or so as to have increased solubility/affinity for an extraction solvent, for example.

The skilled person having regard to the teachings herein will understand that target metals may be removed from the liquid sample using any suitable physical or chemical technique applicable to the particular application being contemplated. By way of example, precipitation/decanting, skimming, solvent-solvent extraction, filtration, trituration, settling/density separation/centrifugation, co-precipitation, or other suitable technique may be used depending on the particular application and form of the target metal generated by the particular process. As will be understood, removed target metals may be either recovered for subsequent use, processing, or sale, or may be discarded. In examples where the recovered target metal is of value, target metal recovery using processes as described herein may be particularly desirable.

The skilled person having regard to the teachings herein will understand that acoustic cavitation as described herein refers to the formation of vapor cavities/bubbles within the liquid sample using ultrasound. Acoustic cavitation may also be understood as sonication. Many acoustic cavitation/sonication frequencies may be possible. By way of example, acoustic cavitation in the range of about 20 kHz to about 2.4 MHz may be used. In certain preferred embodiments, acoustic cavitation in the range of from about 350 to about 800 kHz may be used. In certain further embodiments, acoustic cavitation in the range of from about 500 to about 600 kHz may be used. It has been found herein that combining Fenton's oxidation treatment (without the addition of hydrogen peroxide) with acoustic cavitation may generate hydroxy radicals and/or other oxygen radicals, resulting in enhanced target metal separation. Without wishing to be bound by theory, ferro-cavitation as described herein is believed to enhance the production of hydroxyl radicals through Fenton's oxidation and/or enhance interaction between the resulting hydroxyl radicals and/or iron species with the target metal, thereby enhancing target metal separation.

Indeed, it has been found herein that by producing Fenton's oxidation with cavitation, without need for hydrogen peroxide addition, enhanced metals separation and/or recovery from liquid samples may be achieved. Combined Fenton's oxidation/acoustic cavitation processes as described herein may also be referred to as "ferro-cavitation" processes. Such treatment processes combine acoustic cavitation/sonication and Fenton's oxidation, thereby allowing for production of hydroxyl radicals in a liquid to be treated. Ferro-cavitation processes as described herein do not require the addition of hydrogen peroxide to the liquid to be treated. Rather, the formation of hydrogen peroxide and hydroxyl radicals in the medium during cavitation provide strong oxidants, the formation of which (without wishing to be bound by theory) may be effected, at least in part, by final collapse temperature and pressure within the bubble. Hydrogen peroxide formation during cavitation in liquids to be treated may suffice, thereby avoiding the need for potentially costly hydrogen peroxide addition steps which have been previously used in the art.

The skilled person having regard to the teachings herein will understand that Fenton's oxidation treatments have been previously used in the field of wastewater treatment, allowing for removal of certain organic compounds. In certain embodiments, processes as described herein may allow for removal of such organic compounds as well, in addition to target metal removal. Examples of organic compounds which may be removed may include pharmaceuticals, personal care products, bisphenol A, carbamazepine, and/or dioxins.

In certain embodiments, processes as described herein may allow for the removal of target organic compounds or contaminants such as, but not limited to, persistent organic polymers (POPs). By way of example, processes as described herein may allow for removal of perfluorooctane sulfonate (PFOS) and/or perfluoroheptane sulfonate (PFHpS) and/or other Per- and polyfluoroalkyl substances (PFAS).

Ferro-cavitation treatment processes allowing for metal separation/recovery as described herein may allow for treatment of liquids, such as process-affected water, to remove or reduce metal content, allowing for re-use of the water with reduced scaling or build-up of metals in processing equipment. In addition, treatment processes as described herein may allow for low-cost continuous tailings treatment processes, which avoid or reduce hydrogen peroxide addition demands.

Metal separation/recovery processes as described herein may be additionally accompanied by a further, optional, step of ligand addition to the liquid sample, wherein the ligand is for binding/complexing with the metal (in any suitable form including elemental form, salt, oxide, complex or chelate) to be separated/recovered. Association of the ligand with the metal may affect the solubility of the metal and/or otherwise assist in metal separation/recovery, optionally in the form of metal oxide(s). As discussed in further detail in the examples below, it has been found herein that combining Fenton's oxidation via cavitation (i.e. ferro-cavitation) with ligand addition to obtain selective separation, the separation/recovery of target metals from a liquid sample may be even further enhanced. Indeed, some of the best target metal recoveries were achieved using a combination of ferro-cavitation and ligand addition, as exemplified in Example 6 below.

In certain embodiments, so-called "green", or environmentally friendly ligands may be selected, such as ethylenediaminetetraacetic acid (EDTA) or a salt form thereof. In other embodiments, ligands particularly effective for a selected target metal may be used, such as 2-(aminomethyl) pyridine for selenium.

Selenium is one example of a metal which may be separated/recovered using processes as described herein. As will be understood, selenium may exist as elemental selenium (insoluble; precipitates from solution), selenite ($SeO_3^{2-}$; soluble, can be reduced), and selenate ($SeO_4^{2-}$; soluble, can be removed by co-precipitation with iron). Selenium removal using iron coprecipitation is described in, for example, Merrill et al., Field Evaluation of Arsenic and Selenium Removal by Iron Co-precipitation, *Environmental Progress*, 1987, 6(2):82-90 (herein incorporated by reference in its entirety). Selenium fractionation is described in Shrimpton et al., Fractionation of Selenium during Selenate Reduction by Granular Zerovalent Iron, *Environ. Sci. Technol.*, 2015, 49:11688-11696 (herein incorporated by reference in its entirety).

Selenium/iron interactions leading to elemental selenium precipitation may be considered as follows:

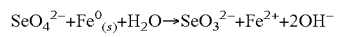

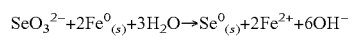

Selenium may be removed and/or recovered using ferro-cavitation processes as described herein. These processes may be further enhanced using an optional selenium-targeting ligand which further affects the solubility of selenium and/or other chemical properties facilitating removal and/or separation. One such ligand contemplated for use herein is 2-(aminomethyl)pyridine:

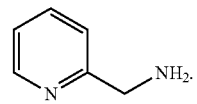

Without wishing to be bound by theory, interactions between 2-(aminomethyl)pyridine ligand and selenium may include, for example:

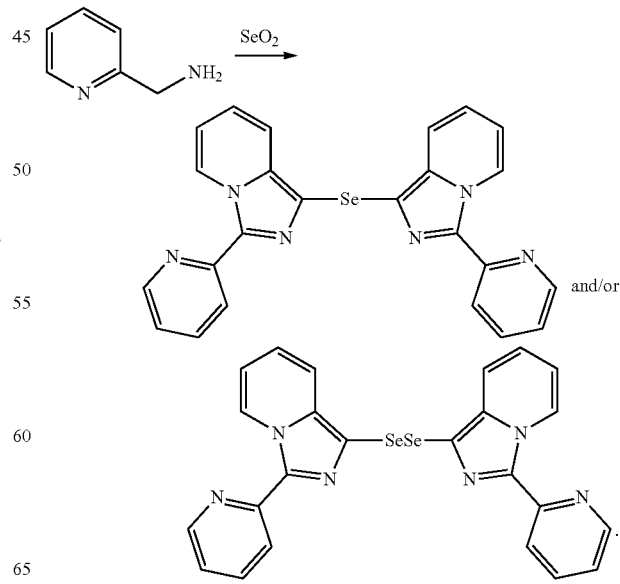

In still another embodiment, there is provided herein a system for removing a target metal from a liquid sample, said system comprising:
- a vessel for containing and, optionally, mixing the liquid sample;
- an acoustic cavitation module for applying acoustic cavitation to the liquid in the vessel;
- an input for adding an iron (II) salt, or a precursor form thereof, to the liquid sample in the vessel such that Fenton oxidation reaction between the iron and hydrogen peroxide in the liquid occurs, thereby producing hydroxyl radicals; and
- optionally, an output for removing produced target metal salt or metal oxide having a reduced solubility in the liquid sample from the liquid sample.

As will be understood, such systems may be used to perform processes for removing a target metal from a liquid sample as described in detail herein.

Suitable vessels may include any suitable container for liquid, such a reactor vessel, drum, tank, or other suitable structure. Vessels may, optionally, include a mixing tool for mixing liquid contained therein.

Suitable acoustic cavitation modules may include any suitable acoustic cavitation apparatus known in the art, such as those commercially available from Cole-Parmer, Fisher Scientific, and/or Ultraschalltechnik-Meinhardt GMBH, Germany, for example. Acoustic cavitation modules may include any suitable devices capable of imparting acoustic cavitation to the liquid. The acoustic cavitation may be, for example, in a range of from 20 kHz to 2.4 MHz, or from 350 kHz to 800 kHz, or from 500-600 kHz.

Suitable inputs for adding an iron (II) salt, or a precursor form thereof, to the liquid sample may include any suitable nozzle, port, hatch, access, injector, or other suitable apparatus for adding iron (II) salt, or a precursor form thereof, to the liquid in the vessel.

Suitable outputs for removing produced target metal salt or metal oxide may include any suitable nozzle, port, hatch, access, ejector, or other suitable apparatus for removing produced target metal salt or metal oxide from the vessel. In certain embodiments, the output may be for removing the target metal salt or metal oxide having reduced solubility in the liquid sample as a precipitate, for example.

In certain embodiments, the system may further comprise:
- a second input for adding a ligand for the target metal to the liquid sample in the vessel.

As will be understood, suitable inputs for adding a ligand for the target metal to the liquid sample in the vessel may include any suitable nozzle, port, hatch, access, injector, or other suitable apparatus for adding ligand to the liquid in the vessel.

In certain alternative embodiments of systems as described herein, the input for adding an iron (II) salt, or a precursor form thereof, to the liquid sample may also be for adding a ligand for the target metal to the liquid sample in the vessel.

In further embodiments, systems as described herein may generate hydrogen peroxide in the liquid sample when acoustic cavitation is applied thereto, thus removing need for addition of hydrogen peroxide to the liquid sample.

In another embodiment, there is provided herein a process for upgrading bitumen, said process comprising:
applying acoustic cavitation to the bitumen; and adding an iron (II) salt, or a precursor form thereof, to the bitumen and allowing Fenton oxidation reaction to occur between the iron and hydrogen peroxide in the bitumen, thereby producing hydroxyl radicals.

As will be understood, upgrading bitumen may include reducing viscosity; reducing target metal content; asphaltene separation; disintegration or solubilisation of asphaltene flocs; reducing persistent organic polymers (POPs) content.

In certain embodiments, the POPs may comprise perfluorooctane sulfonate (PFOS) or perfluoroheptane sulfonate (PFHpS) or other Per- and polyfluoroalkyl substances (PFAS).

In certain embodiments, the acoustic cavitation may be applied in a range of from 20 kHz to 2.4 MHz, or from 350 kHz to 800 kHz. In certain embodiments, the acoustic cavitation may be in a range of from 500-600 kHz.

Cavitation yield and period of sonication are parameters that influence ferro-cavitation processing. In certain embodiments, the preferred period of sonication may be about 30 minutes or higher (up to 1 hour), while a power (and related cavitation) intensity of 50% may be optimal for 574 KHz. The preferred range of cavitation intensity for various frequencies from 378 KHz. to 1173 KHz will typically range from 50-90%. The period of sonication preferred in such embodiments may be between 30 and 60 minutes.

Similarly, for low frequency sonication (20 and 40 KHz.), the preferred power intensity may be about 90% and the period of sonication may be about 1 hour.

In still another embodiment, there is provided herein a system for performing a process for upgrading bitumen as described hereinabove, said system comprising:
- a vessel for containing and, optionally, mixing the bitumen;
- an acoustic cavitation module for applying acoustic cavitation to the bitumen in the vessel; and
- an input for adding an iron (II) salt, or a precursor form thereof, to the bitumen in the vessel such that Fenton oxidation reaction between the iron and hydrogen peroxide in the bitumen occurs, thereby producing hydroxyl radicals.

In yet another embodiment, there is provided herein a process for removal of an organic contaminant from a liquid sample, said process comprising:
applying acoustic cavitation to the liquid sample; and
adding an iron (II) salt, or a precursor form thereof, to the liquid sample and allowing Fenton oxidation reaction to occur between the iron and hydrogen peroxide in the liquid sample, thereby producing hydroxyl radicals.

In certain embodiments, the process may further lead to removal of a target metal from the liquid sample as already described hereinabove.

As will be understood, the organic contaminant may comprise, for example, a persistent organic polymer (POP). In yet another embodiment, the POP may comprise perfluorooctane sulfonate (PFOS) or perfluoroheptane sulfonate (PFHpS) and/or other Per- and polyfluoroalkyl substances (PFAS).

In yet another embodiment, the acoustic cavitation may be in a range of from 20 kHz to 2.4 MHz, or from 350 kHz to 800 kHz. In certain embodiments, the acoustic cavitation may be in a range of from 20-40 kHz.

In yet another embodiment, there is provided herein a system for performing a process for removal of an organic contaminant from a liquid sample as described hereinabove, said system comprising:
- a vessel for containing and, optionally, mixing the liquid sample;

an acoustic cavitation module for applying acoustic cavitation to the liquid sample; and an input for adding an iron (II) salt, or a precursor form thereof, to the liquid sample such that Fenton oxidation reaction between the iron and hydrogen peroxide in the bitumen occurs, thereby producing hydroxyl radicals.

Example 1—Cavitation Experiments for Upgrading of Bitumen: Viscosity Change and Chemical Cavitation Yield Measurements In order to assess the effects of cavitation on bitumen upgrading, a series of experiments were designed and performed to investigate sonication power outputs, cavitation yields, and viscosity effects. An empirical determination of the cavitation yield in mid to high frequency range (378 kHz, 574 kHz, 850 kHz, 992 kHz and 1.1 MHz) was carried out by measuring the amount of iodine liberated from the oxidation of potassium iodide (KI). Further, cavitation yield and effects of different sonic operating conditions such as power input (16.67 to 83.33%) and solute concentration on cavitation yield were carried out in KI solution and sodium carboxymethyl cellulose (CMC-water mixture to obtain benchmark changes in rheology and chemistry using the two model fluids. Findings were then applied to bitumen upgrading through sonication.

Low frequency (20 kHz and 40 kHz) ultrasonic experiments were carried out by using an ultrasonic homogenizer (Autotune 750 W, Cole-Parmer Instruments, Vernon Hills, Ill., USA). A mid to high frequency (378 kHz, 574 kHz, 860 kHz, 992 kHz and 1.1 MHz) sono-chemical processing system was assembled using a broadband transducer (Ultraschalltechnik-Meinhardt GMBH, Germany). The transducer was installed at the bottom of a coolant-jacketed glass column reactor with a diameter of 5 cm and 100 cm in height. The ultrasound energy was supplied by a power amplifier (HM8001-2) through a function generator (HM 8030-5 and HM 8032). Sonication experiments were carried out at five different frequency conditions using two different broadband transducer with the same effective diameter. The reactor was supplied with different power input starting from 16.67 to 83.33%. The cooling system was operated to maintain a constant temperature. The experiment was carried out with a sample volume of 100 mL held within a jacked glass cooling column. Experimental results are provided in Table 1 below.

TABLE 1

Measured power inputs for a range of intensity settings under different conditions of sonication frequency

| Sonication frequency (kHz) | Power input (%) | Power intensity (W) | Voltage (V) |
|---|---|---|---|
| 378 | 16.67 | 210 | 118 |
|  | 33.33 | 248 | 118 |
|  | 50 | 304 | 118 |
|  | 66.66 | 360 | 117 |
|  | 83.33 | 426 | 116 |
| 574 | 16.67 | 209 | 118 |
|  | 33.33 | 252 | 118 |
|  | 50 | 304 | 118 |
|  | 66.66 | 376 | 118 |
|  | 83.33 | 446 | 118 |
| 990 | 16.67 | 208 | 116 |
|  | 33.33 | 249 | 116 |
|  | 50 | 295 | 117 |
|  | 66.66 | 346 | 118 |
|  | 83.33 | 413 | 118 |
| 1173 | 16.67 | 199 | 116 |
|  | 33.33 | 256 | 116 |
|  | 50 | 303 | 118 |
|  | 66.66 | 369 | 118 |
|  | 83.33 | 452 | 117 |

Experimental measurement of cavitation yield was also performed. Experiments were carried out to determine the cavitation yield at 378, 574, 860, 992 and 1173 kHz in water. Further studies were carried out to observe the effect of these sonication frequencies in heavy oil. Cavitation yield measurements were carried out to determine the amount of iodine liberated when potassium iodide solutions at different concentrations were subjected to ultrasound. Cavitation yield was defined as the grams of iodine liberated per unit power density during the oxidation of potassium iodide by hydroxide and peroxy radicals. The amount of liberated iodine was measured using a UV/VIS spectrophotometer at 350 nm and quantified using a calibration curve ranging from 0 to $4 \times 10^{-3}$ M of iodine for determining the cavitation yield at various intervals of time.

Figure 2:
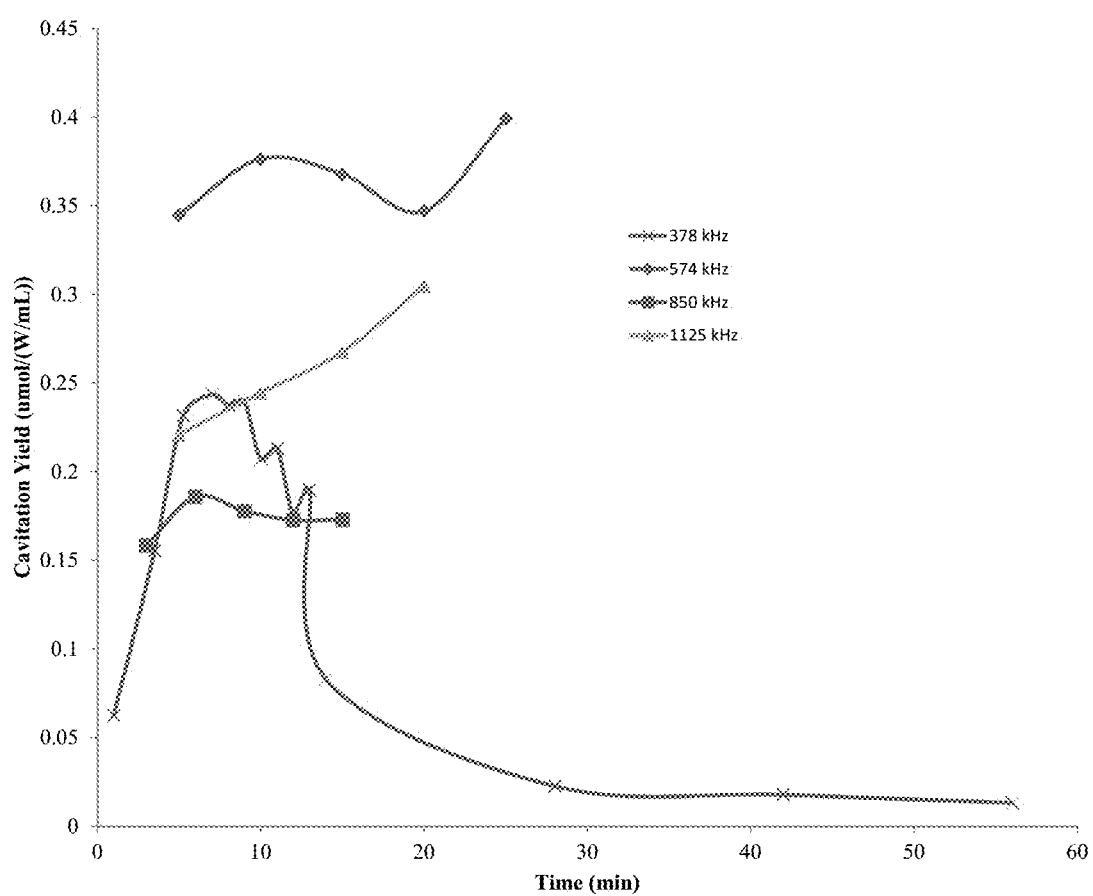
FIG. 2 shows a graph indicating cavitation yield obtained under different conditions of sonication frequency and time using 0.1 wt % KI solution.
Figure 3:
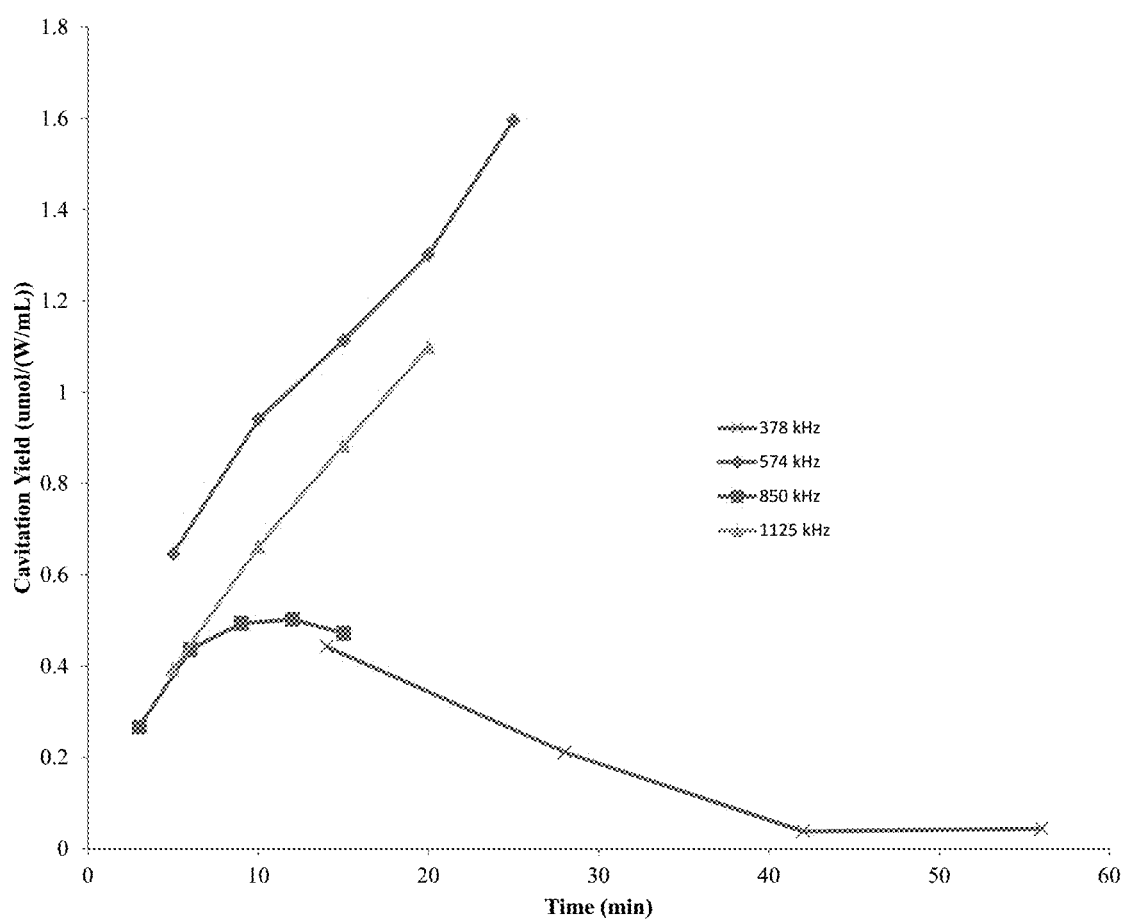
FIG. 3 shows a graph indicating cavitation yield obtained under different conditions of sonication frequency and time using 0.1 wt % KI solution.
Figure 4:
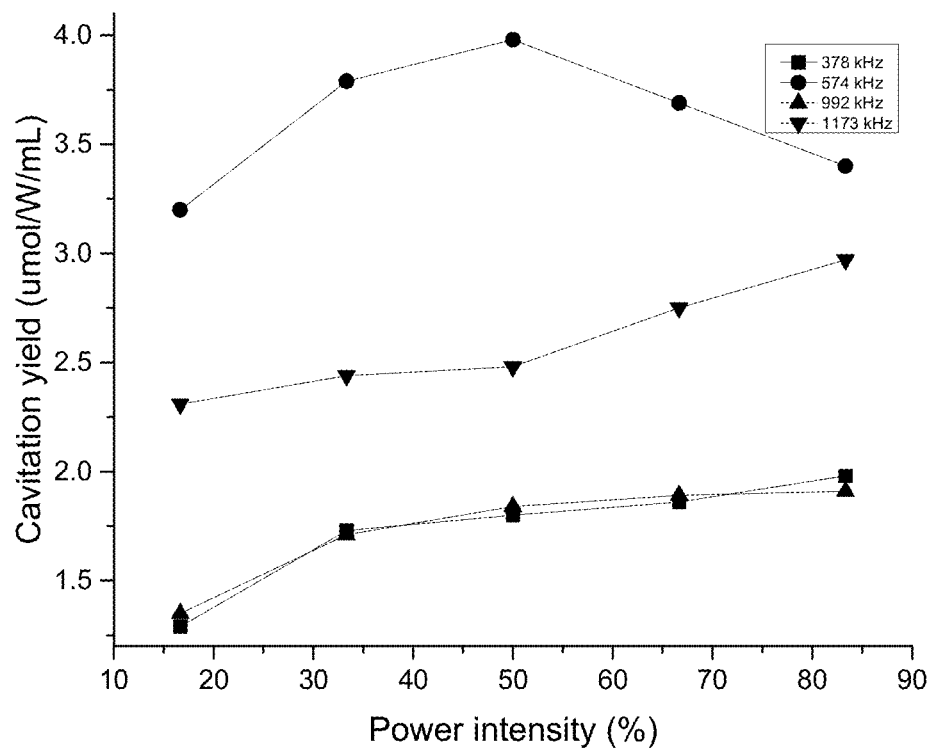
FIG. 4 shows a graph indicating cavitation yield obtained with different power intensity at different sonication frequencies sonicated for 30 minute sonication treatments in 1.0 wt % KI solutions.
Figure 5:
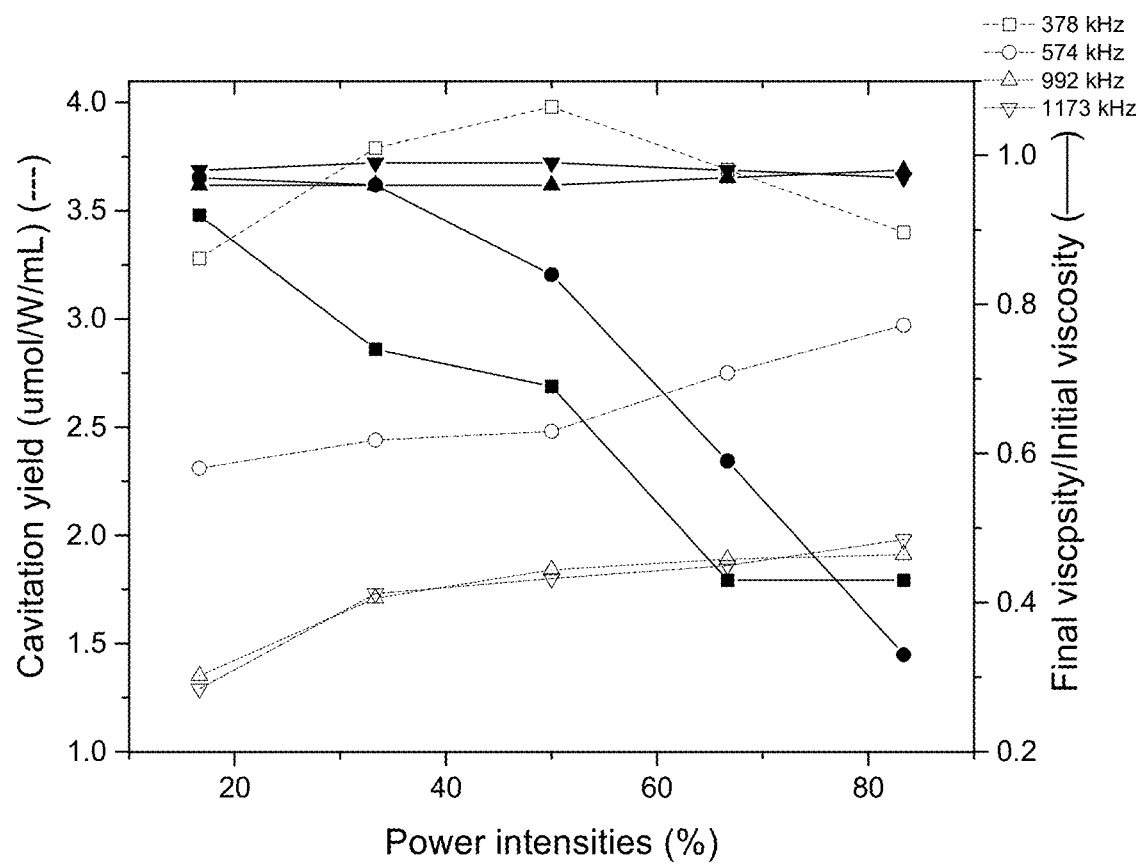
FIG. 5 shows a graph indicating cavitation yield and viscosity change under different conditions of sonication frequency and power intensities in CMC-water sonicated for 30 min.

Results are provided in FIGS. 1-5. FIG. 1 shows an iodine calibration curve obtained using a UV-V is spectrophotometer. FIG. 2 shows cavitation yield obtained under different conditions of sonication frequency and time using 0.1 wt % KI solution. FIG. 3 shows cavitation yield obtained under different conditions of sonication frequency and time using 1.0 wt % KI solution. FIG. 4 shows cavitation yield obtained with different power intensity at different sonication frequencies sonicated for 30 minute sonication treatments in 1.0 wt % KI solutions. FIG. 5 shows cavitation yield and viscosity change under different conditions of sonication frequency and power intensities in CMC-water sonicated for 30 min.

Figure 6:
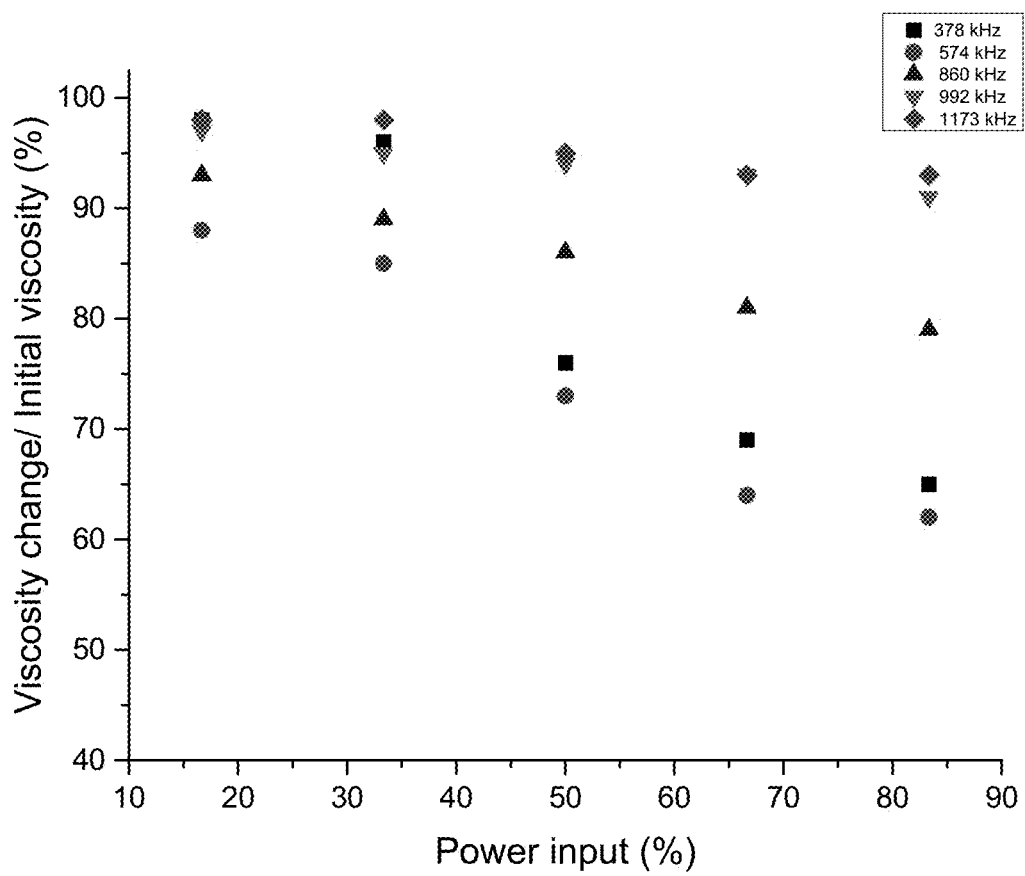
FIG. 6 shows a graph indicating viscosity change at different sonication frequency for different power input in bitumen.

Rheology studies were also performed. Viscosity of naptha diluted bitumen was measured by using a rotational viscometer Brookefield DV-II Prime (Brookfield Engineering Laboratories Inc., Stoughton, Mass., USA) equipped with Wingather software (for rheological models). Two different spindles, namely, SC-31 (small sample adaptor), and ultralow centipoise adapter were used with a sample cup volume of 18 mL/50 mL (spindle dependent). The calibration and viscosity testing procedure for each spindle was carried out as per instrument manual. The shear rate behavior was determined from 0.5 to 20 $s^{-1}$. FIG. 6 shows viscosity change at different sonication frequency for different power input in bitumen.

Together, these results indicate that mid-range frequency levels such as 378 and 574 kHz were more effective in terms of increase in cavitation yield and viscosity changes in bitumen heavy oil under the conditions tested. Highest viscosity change of 38% was observed at sonication frequency of 574 kHz with 83.33% power input, and lowest viscosity change (5%) was observed at sonication frequency of 1173 kHz with a power input of 83.33%. Higher viscosity change observed at 574 kHz sonication frequency was due to higher cavitation yield, which showed a direct relationship between cavitation yield and viscosity change.

Different factors such as power inputs and solute concentration affect the cavitation yield in the medium. A condition of 574 kHz sonication frequency and 83.33% power input was observed as the best method for decreasing the viscosity of bitumen as compared to other frequencies tested under the experimental conditions.

Example 2—Bitumen Heavy Oil Upgrading by Cavitation Processing: Effect on Asphaltene Separation, Rheology, and Metal Content In order to assess the effects of cavitation processing on bitumen heavy oil upgrading, a series of experiments were designed and performed to investigate the effects of cavitation on bitumen viscosity, asphaltene separation from naphtha diluted bitumen, and metals content of asphaltenes separated from sonicated bitumen. Ultrasonic treatment resulted in a decrease in asphaltene content in bitumen that led to lower viscosity and shear stress over a wide range of shear rates. Over the range of sonication frequencies investigated (20 kHz to 1.1 MHz), the sonication frequency of 574 kHz with 50% power input resulted in low asphaltene content and lower viscosity suitable for improved transportability. Further, comparison of different conditions of sonication frequencies and power inputs was carried out to investigate the effect of ultrasound on properties of asphaltene (elemental analysis and metal content). It was observed that the sonication treatment of bitumen under different conditions of frequency and acoustic power decreased the H/C ratio under the conditions tested.

Figure 7:
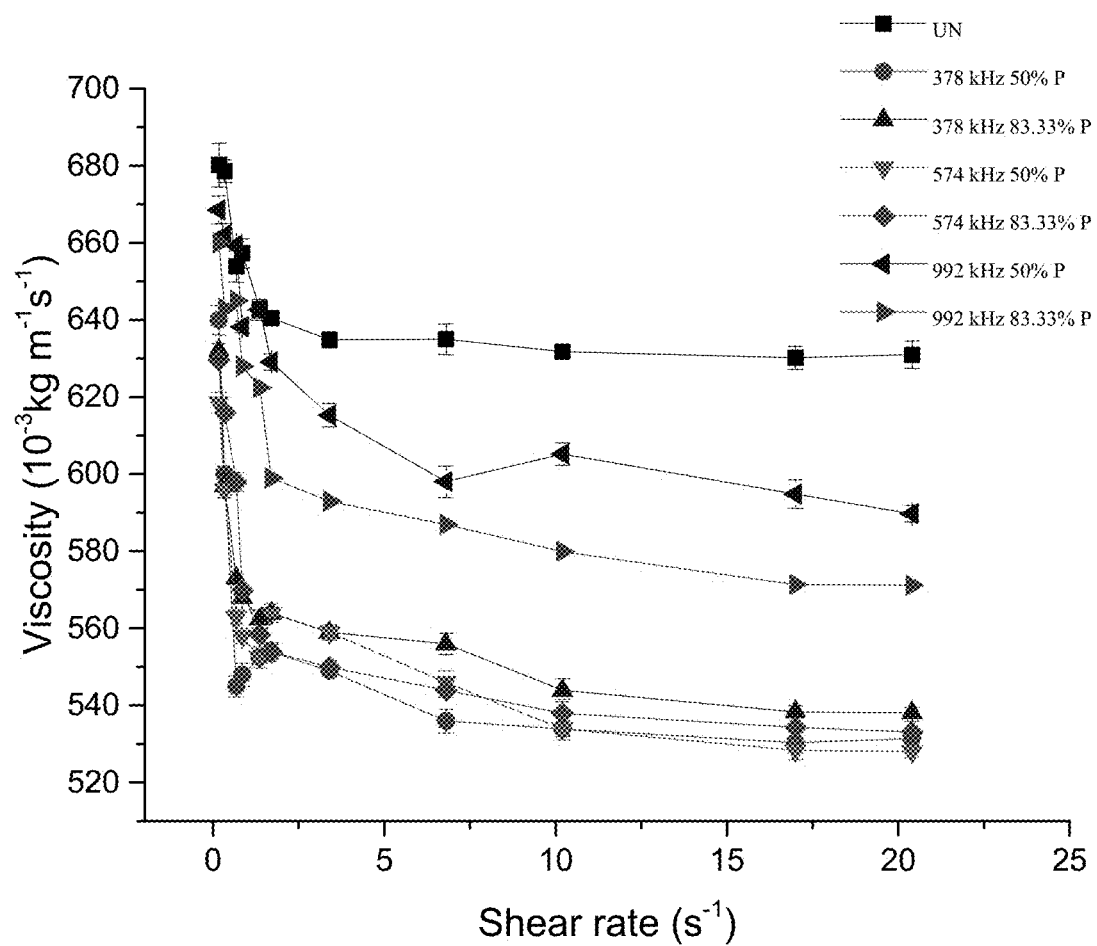
FIG. 7 shows a graph indicating change of viscosity at different shear rate of unsonicated (UN) and sonicated (378, 574, and 992 kHz) bitumen at power input of 50% and 83.33%.
Figure 8:
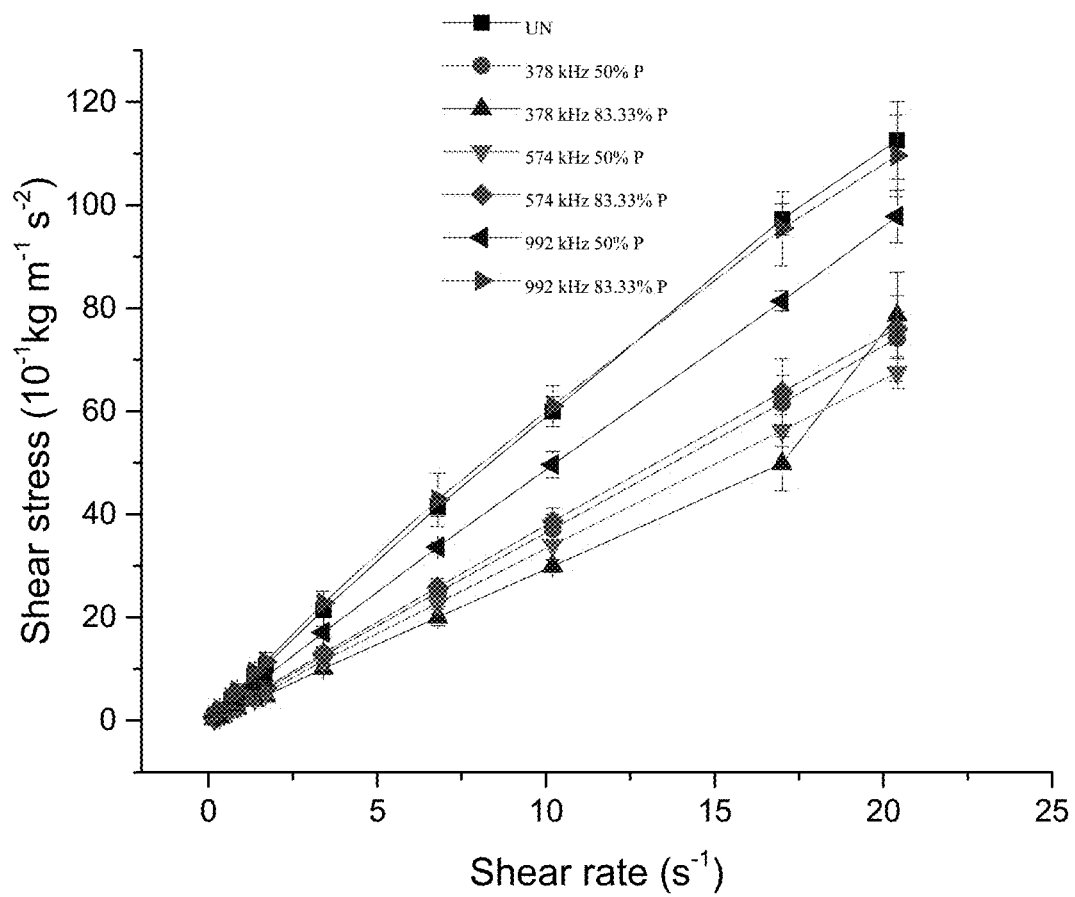
FIG. 8 shows a rheogram of unsonicated (UN) and sonicated (378, 574, and 992 kHz) bitumen at power input of 50% and 83.33%.

As in Example 1, viscosity of naphtha diluted bitumen was measured by using a rotational viscometer Brookefield DV-II Prime (Brookfield Engineering Laboratories Inc., Stoughton, Mass., USA) equipped with Wingather software (for rheological models). Two different spindles, namely, SC-31 (small sample adaptor), and ultralow centipoise adapter were used with a sample cup volume of 18 mL/50 mL (spindle dependent). The calibration and viscosity testing procedure for each spindle was carried out as per instrument manual. The shear rate behavior was determined from 0.5 to 20 $s^{-1}$. FIG. 7 shows the change of viscosity at different shear rate of unsonicated (UN) and sonicated (378, 574, and 992 kHz) bitumen at power input of 50% and 83.33%. FIG. 8 shows a rheogram of unsonicated (UN) and sonicated (378 kHz, 574 kHz, and 992 kHz) bitumen at power input of 50% and 83.33%.

Asphaltenes were extracted from unsonicated and sonicated naptha diluted bitumen samples as per ASTM-D6560-12. The extraction process was initiated with 4 g of oil sample in a round bottom flask followed by addition of 120 mL of heptane. The mixture was then boiled under reflux for 60 min. and stored in a dark place for 90 to 150 min. The resulting solution was filtered through a thimble (Whatman (GE Healthcare Life Sciences, Quebec, Canada) double thickness, 43 mm×123 mm) and then the thimble was placed into a Soxhlet extraction apparatus and refluxed with heptane for minimum 60 min to separate the wax and resin compounds. Further, the asphaltene was separated under reflux by using toluene in the extractor and the content was transferred to a 500 mL round bottom flask weighed previously. After completion of asphaltene separation, the toluene was evaporated in a rotary evaporator completely and the mass of asphaltene was measured.

Results are shown in Table 2 below.

TABLE 2

Asphaltene separation from naptha diluted bitumen at different sonication frequency and power input

| Sonication frequency (kHz) | Power (Amplitude) (%) | Sonication time (min) | Asphaltene separation (g) | Yield (%, m/m) |
|---|---|---|---|---|
| Unsonicated sample | — | — | 0.59 | 14.9 |
| 378 | 16.67 | 30 | 0.47 | 11.7 |
|  | 33.33 | 30 | 0.32 | 8.0 |
|  | 50 | 30 | 0.25 | 6.2 |
|  | 66.67 | 30 | 0.23 | 5.4 |
|  | 83.33 | 30 | 0.18 | 4.3 |
| 574 | 16.67 | 30 | 0.36 | 8.4 |
|  | 33.33 | 30 | 0.35 | 8.2 |
|  | 50 | 30 | 0.28 | 7.3 |
|  | 66.67 | 30 | 0.15 | 3.7 |
|  | 83.33 | 30 | 0.13 | 3.1 |
| 860 | 16.67 | 30 | 0.56 | 12.7 |
|  | 33.33 | 30 | 0.45 | 11.2 |
|  | 50 | 30 | 0.49 | 12.5 |
|  | 66.67 | 30 | 0.58 | 11.5 |
|  | 83.33 | 30 | 0.52 | 11.0 |
| 992 | 16.67 | 30 | 0.51 | 12.7 |
|  | 33.33 | 30 | 0.38 | 9.5 |
|  | 50 | 30 | 0.43 | 9.1 |
|  | 66.67 | 30 | 0.51 | 8.7 |
|  | 83.33 | 30 | 0.56 | 8.5 |
| 1173 | 16.67 | 30 | 0.43 | 13.7 |
|  | 33.33 | 30 | 0.59 | 14.9 |
|  | 50 | 30 | 0.59 | 13.8 |
|  | 66.67 | 30 | 0.38 | 13.5 |
|  | 83.33 | 30 | 0.58 | 14.6 |

Asphaltene samples were characterized. Analysis of presence of heavy metals (Ni, Fe and V) in asphaltene samples was carried out by using total reflection X-ray fluorescence (TXRF) and inductively coupled plasma mass spectrometer (ICP-MS) method. TXRF is basically an energy dispersive XRF technique in a special geometry. An incident beam impinges upon a sample at angles below the critical angle of external total reflection for X-rays resulting in reflection of almost 100% of the excitation beam photons. Due to its unique configuration, the main advantage of TXRF over conventional XRF is reduced measurement background contributions by elimination of sample scattering resulting in increased elemental measurement sensitivity. For TXRF analysis, 10 mg of asphaltene sample was dissolved in 1 mL toluene followed by addition of 10 μL of Gallium as internal standard. Then the sample was mixed properly in a vortex for 2 to 5 min. Further, 10 μL of sample was dried in the surface of a polished quartz glass for further analysis by TXRF.

For ICP-MS analysis, 0.2 g of asphaltene was weighed into a microwave digesting vessel followed by addition of 10 ml of nitric acid and 1 mL of hydrochloric acid. Further, 2 mL of 30% $H_2O_2$ was added to the acid mixtures and the acid-peroxide mixture was transferred for the microwave digestion system. The digestion process was performed by using a Multiwave-microwave sample preparation system (Anton Parr, Ashland, Va.) with infrared temperature control and hydraulic pressure control with feedback function capable of reducing microwave power near the limit of operating pressure. The microwave digestion process was conducted at microwave power of 1400 W, operating pressure of 60 bar and temperature 180±1° C. for 1 hour. Further, the digestate was dried in a hot block (Environmental Express, Mass.) at 106° C. until complete dryness followed by addition of 25 mL of 1M HCl for analysis in ICP-MS.

Elemental analysis of asphaltene samples was performed to determine the carbon, hydrogen, nitrogen and sulfur content. The analysis was carried out by using a Vario MICRO CUBE analyzer (Elementar, Hanau, Germany).

Results are shown in Tables 3 and 4 below.

TABLE 3

Metal content of asphaltene sample extracted from bitumen sonicated under different frequency and power inputs observed by TXRF method

| Sonication frequency | Power input (%) | Heavy Metals Concentration (mg/L) | | |
|---|---|---|---|---|
| | | Ni | V | Fe |
| 378 kHz | 16.67 | 358.8 ± 2.7 | 932.0 ± 8.1 | 1146.0 ± 12.1 |
| | 33.33 | 345.2 ± 1.7 | 893.2 ± 6.9 | 1084.2 ± 10.8 |
| | 50 | 358.8 ± 2.5 | 941.0 ± 5.7 | 985.0 ± 5.8 |
| | 66.67 | 400.8 ± 3.9 | 1056.5 ± 5.1 | 1725.1 ± 8.4 |
| | 83.33 | 397.6 ± 1.4 | 1052.3 ± 3.4 | 1122.7 ± 3.8 |
| 574 kHz | 16.67 | 416.3 ± 2.5 | 1094.5 ± 6.2 | 1914.3 ± 9.1 |
| | 33.33 | 384.9 ± 2.0 | 1015.7 ± 4.8 | 2310.0 ± 5.7 |
| | 50 | 326.9 ± 1.6 | 846.8 ± 3.7 | 850.3 ± 2.8 |
| | 66.67 | 286.1 ± 3.2 | 726.3 ± 2.9 | 727.6 ± 4.9 |
| | 83.33 | 385.7 ± 2.4 | 1001.4 ± 6.8 | 1297.5 ± 3.7 |
| 860 kHz | 16.67 | 356.6 ± 1.9 | 959.6 ± 9.1 | 3134.4 ± 7.5 |
| | 33.33 | 342.9 ± 1.4 | 913.7 ± 7.2 | 3107.7 ± 4.5 |
| | 50 | 342.1 ± 3.4 | 889.7 ± 2.8 | 3043.3 ± 3.7 |
| | 66.67 | 315.4 ± 1.8 | 790.3 ± 3.7 | 2612.9 ± 7.6 |
| | 83.33 | 384.9 ± 3.9 | 978.2 ± 6.1 | 3290.4 ± 6.1 |
| 992 kHz | 16.67 | 421.9 ± 2.6 | 1121.7 ± 5.7 | 1338.6 ± 9.8 |
| | 33.33 | 260.6 ± 2.1 | 675.4 ± 1.9 | 1025.5 ± 5.7 |
| | 50 | 305.5 ± 4.0 | 780.2 ± 6.8 | 991.8 ± 3.8 |
| | 66.67 | 305.6 ± 3.5 | 795.8 ± 5.7 | 1007.5 ± 6.1 |
| | 83.33 | 260.7 ± 2.1 | 671.3 ± 8.0 | 921.5 ± 7.5 |
| 1173 kHz | 16.67 | 293.6 ± 3.3 | 765.0 ± 6.4 | 2173.0 ± 3.4 |
| | 33.33 | 298.6 ± 1.6 | 791.5 ± 5.7 | 1770.2 ± 8.1 |
| | 50 | 329.8 ± 3.7 | 845.5 ± 4.9 | 2342.7 ± 3.7 |
| | 66.67 | 333.8 ± 2.9 | 858.6 ± 6.1 | 1816.5 ± 9.1 |
| | 83.33 | 290.0 ± 2.4 | 714.9 ± 8.6 | 1487.3 ± 5.1 |

TABLE 4

Metal content of asphaltene sample extracted from bitumen sonicated under different frequency and power inputs observed by ICP-MS method

| | Power input (%) | Heavy Metals Concentration (mg/L) | | |
|---|---|---|---|---|
| | | Ni | V | Fe |
| 378 kHz | 16.67 | 381.2 ± 1.7 | 946.2 ± 5.2 | 1887.5 ± 10.3 |
| | 33.33 | 287.5 ± 3.0 | 737.5 ± 3.7 | 835 ± 6.8 |
| | 50 | 326.2 ± 1.4 | 792.5 ± 6.1 | 867.5 ± 9.1 |
| | 66.67 | 342.5 ± 0.9 | 861.2 ± 2.9 | 1065 ± 5.7 |
| | 83.33 | 337.5 ± 2.6 | 813.7 ± 2.4 | 568.7 ± 4.9 |
| 574 kHz | 16.67 | 345 ± 1.3 | 863.7 ± 6.1 | 1487.5 ± 10.6 |
| | 33.33 | 352.5 ± 0.8 | 892.5 ± 5.2 | 1227.5 ± 6.2 |
| | 50 | 312.5 ± 0.6 | 758.7 ± 4.2 | 428.7 ± 5.1 |
| | 66.67 | 233.7 ± 1.6 | 602.5 ± 3.1 | 412.2 ± 9.4 |
| | 83.33 | 266.2 ± 1.1 | 635 ± 2.8 | 160 ± 4.3 |
| 860 kHz | 16.67 | 248.7 ± 1.9 | 772.5 ± 6.1 | 333.7 ± 5.8 |
| | 33.33 | 287.5 ± 1.5 | 740 ± 1.8 | 715 ± 3.9 |
| | 50 | 260 ± 2.0 | 647.5 ± 6.4 | 625 ± 6.1 |
| | 66.67 | 317.5 ± 1.8 | 761.2 ± 3.9 | 640 ± 3.8 |
| | 83.33 | 223.7 ± 1.4 | 538.7 ± 4.0 | 252.5 ± 11.0 |

TABLE 4-continued

Metal content of asphaltene sample extracted from bitumen sonicated under different frequency and power inputs observed by ICP-MS method

| | Power input (%) | Heavy Metals Concentration (mg/L) | | |
|---|---|---|---|---|
| | | Ni | V | Fe |
| 992 kHz | 16.67 | 387.5 ± 0.9 | 930 ± 4.5 | 1875 ± 5.8 |
| | 33.33 | 281.2 ± 2.7 | 701.2 ± 3.7 | 1275 ± 10.7 |
| | 50 | 316.2 ± 2.1 | 835 ± 3.1 | 2000 ± 2.9 |
| | 66.67 | 380 ± 0.7 | 997.5 ± 4.7 | 1712.5 ± 4.8 |
| | 83.33 | 342.5 ± 1.5 | 910 ± 1.9 | 1762.5 ± 6.2 |
| 1173 kHz | 16.67 | 331.2 ± 1.2 | 918.7 ± 5.5 | 2562.5 ± 3.8 |
| | 33.33 | 345 ± 3.0 | 910 ± 6.8 | 2550 ± 7.1 |
| | 50 | 377.5 ± 2.4 | 966.2 ± 5.4 | 2800 ± 5.8 |
| | 66.67 | 328.7 ± 0.8 | 865 ± 3.9 | 2262.5 ± 10.2 |
| | 83.33 | 330 ± 2.9 | 912.5 ± 6.1 | 2237.5 ± 8.1 |

Figure 9:
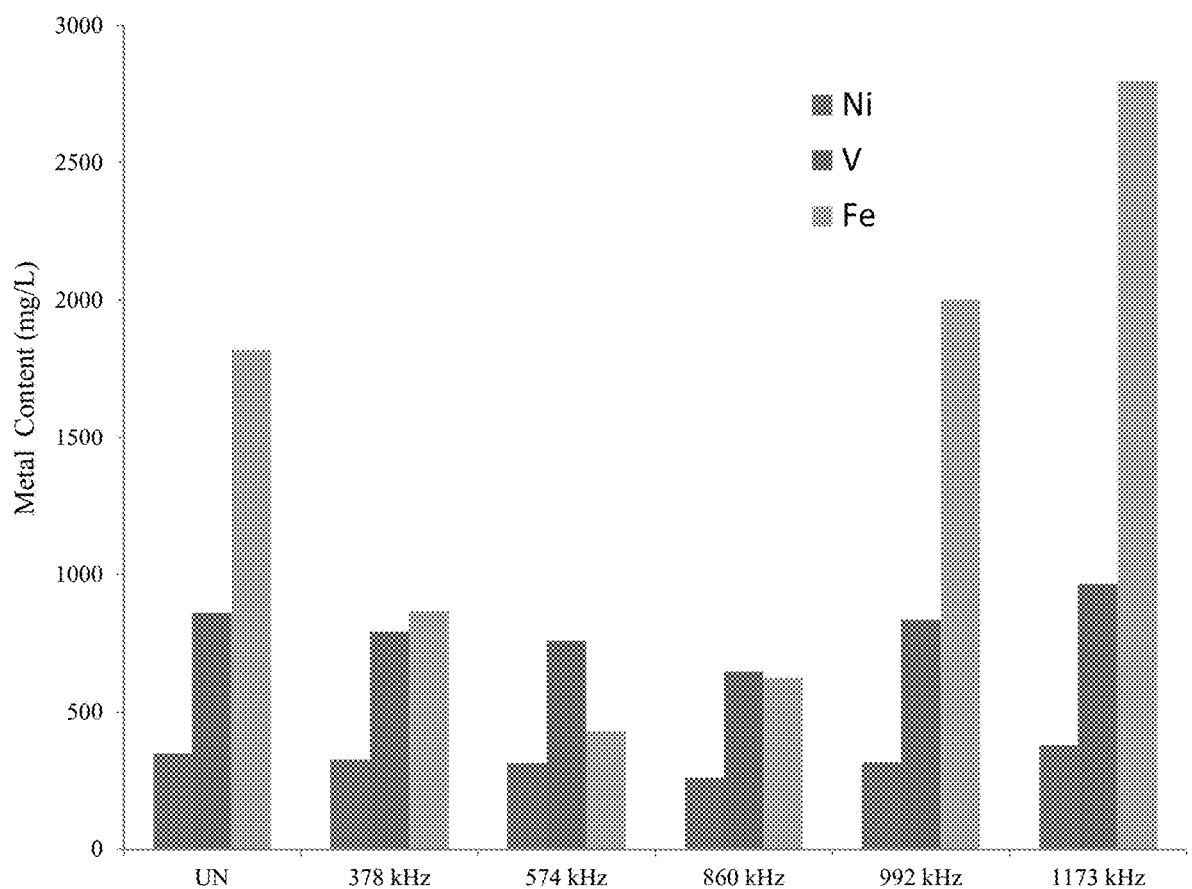
FIG. 9 shows a chart indicating metal content (ICP-MS analysis) of asphaltene extracted from bitumen sonicated under different frequencies and 50% power input (UN: before sonication)
Figure 10:
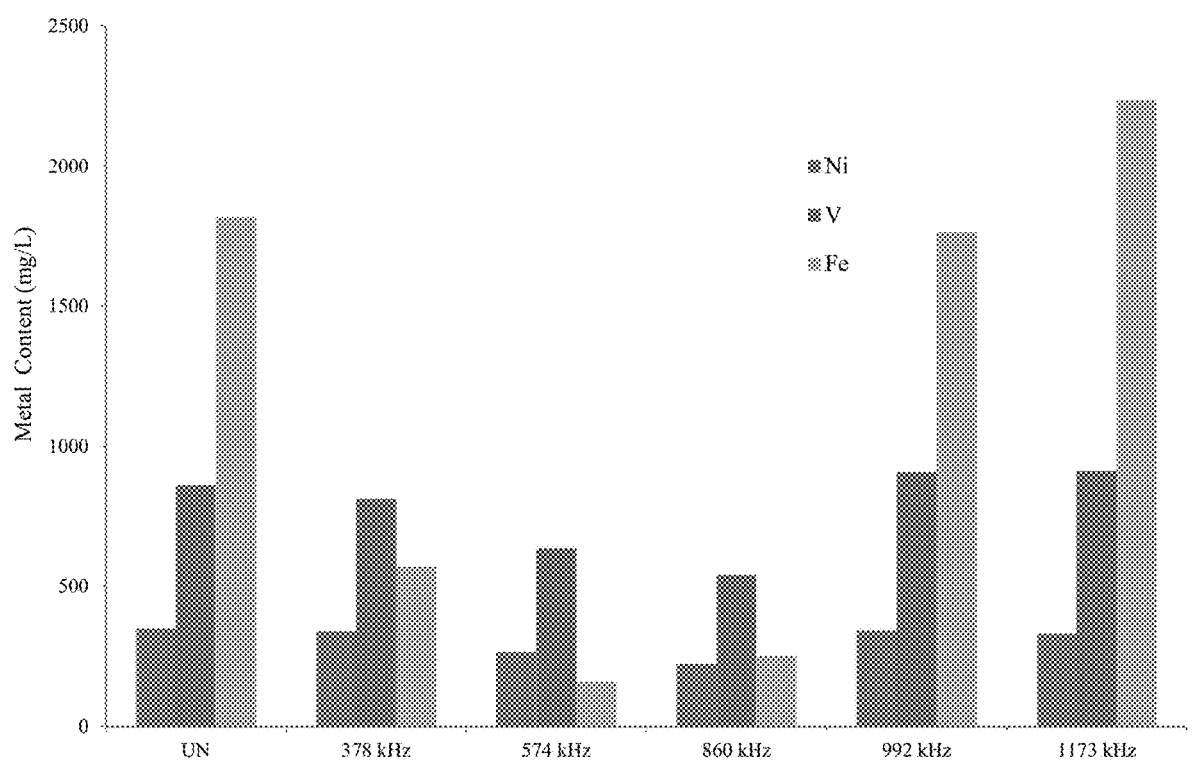
FIG. 10 shows a chart indicating metal content (ICP-MS analysis) of asphaltene extracted from bitumen sonicated under different frequencies and 83.33% power input (UN: before sonication)

FIG. 9 shows metal content (ICP-MS analysis) of asphaltene extracted from bitumen sonicated under different frequencies and 50% power input (UN: before sonication). FIG. 10 shows metal content (ICP-MS analysis) of asphaltene extracted from bitumen sonicated under different frequencies and 83.33% power input (UN: before sonication).

Together, these results indicate that under the experimental conditions used, cavitation treatment processes result in decreases in the mass of asphaltene extracted from bitumen due to the disintegration and solubilisation of asphaltene flocs in the medium. Further, the results show that under the conditions used, sonication treatment of bitumen results in decreases in viscosity and shear stress with shear rate. Greatest changes were observed with sonication frequency of 574 kHz with power input of 50%. Asphaltene content in bitumen plays a dominant role in its viscosity, and ultrasound treatment of bitumen led to decreases in strong attractive interactions among the asphaltene particles, resulting in decreases in viscosity and shear stress indicating shear thinning behavior. Low sonication frequency levels such as 20 kHz and 40 kHz showed no effect on asphaltene content of bitumen under the conditions tested.

Results of cavitation treatment processes of bitumen under different sonication frequencies and power inputs showed changes in metal content (Ni, V and Fe) of asphaltene samples. Under the conditions tested, mid-frequency levels (378 kHz and 574 kHz) showed higher efficiency on decreasing the asphaltene content of bitumen, leading to lower metal content.

Example 3—Comparisons of Advanced Oxidation Processes (AOPs) for Upgrading Bitumen: Change in Viscosity and Asphaltene Characterization In order to assess the effects of advanced oxidation processes (AOPs) on bitumen upgrading, a series of experiments were designed and performed to investigate the effects of cavitation, Fenton oxidation, ozonation, and combined Fenton oxidation/cavitation (Ferro-Cavitation) on bitumen upgrading. Effects on bitumen viscosity, density, change of mass, temperature variation, and asphaltene hydrogen type ($^1$H-NMR) were assessed.

Advanced oxidation treatments resulted in a decrease in asphaltene content in bitumen that led to lower viscosity and shear stress over a wide range of shear rates. Over the range of sonication frequencies tested (20 kHz to 1.1 MHz), the sonication frequency of 574 kHz with 50% power input in particular resulted in low asphaltene content and lower viscosity well-suited for improved transportability. Comparison of the AOPs showed that ferro-cavitation treatment resulted in low asphaltene content, lower viscosity, and higher removal of heavy metal from the asphaltene phase of bitumen under the conditions tested.

Further, comparison of different conditions of sonication frequencies and power inputs during the ferro-cavitation treatments was carried out to investigate the effect of ultrasound on properties of asphaltene (elemental analysis and metal content). It was observed that the ferro-cavitation treatment of bitumen under different conditions of frequency and acoustic power decreased the H/C ratio. These results showed higher content of aromatic hydrogen and lower content of aliphatic hydrogen in bitumen treated under different conditions of sonication frequency and intensity. Characterization of asphaltene, performed using ICP-MS and TXRF revealed lower metal content (Ni, Fe and V) in the asphaltene phase of processed (ferro-cavitation) bitumen.

As in Example 1, low frequency (20 kHz and 40 kHz) ultrasonic experiments were carried out by using an ultrasonic homogenizer (Autotune 750 W, Cole-Parmer Instruments, Vernon Hills, Ill., USA). A mid to high frequency (378 kHz, 574 kHz, 860 kHz, 992 kHz and 1.1 MHz) sono-chemical processing system was assembled using a broadband transducer (Ultraschalltechnik-Meinhardt GMBH, Germany). The transducer was installed at the bottom of a coolant-jacketed glass column reactor with a diameter of 5 cm and 100 cm in height. The ultrasound energy was supplied by a power amplifier (HM8001-2) through a function generator (HM 8030-5 and HM 8032). Sonication experiments were carried out at five different frequency conditions using two different broadband transducer with the same effective diameter. The reactor was supplied with different power input starting from 16.67 to 83.33%. The cooling system was operated to maintain a constant temperature. The experiment was carried out with a sample volume of 100 mL held within a jacked glass cooling column.

As in Examples 1 and 2, viscosity of naptha diluted bitumen was measured by using a rotational viscometer Brookefield DV-II Prime (Brookfield Engineering Laboratories Inc., Stoughton, Mass., USA) equipped with Wingather software (for rheological models). Two different spindles, namely, SC-31 (small sample adaptor), and ultralow centipoise adapter were used with a sample cup volume of 18 mL/50 mL (spindle dependent). The calibration and viscosity testing procedure for each spindle was carried out as per instrument manual. The shear rate behavior was determined from 0.5 to 20 s$^{-1}$.

To initiate Fenton's oxidation reaction, $H_2O_2$ and $FeSO_4$ solution were added to the bitumen samples with different conditions: 0.5 g/l, 0.75 g/l, 1 g/l, 1.5 g/l, and 2 g/l of $FeSO_4$ and with different concentration of $H_2O_2$ (500-1000 μg/l). Fenton's oxidation was carried out at ambient temperature for 180 min using a shaker at 150 rpm.

Ferro-cavitation treatment was carried out by addition of 0.5 g/l, 0.75 g/l, 1 g/l, 1.5 g/l, 2 g/l of $FeSO_4$ in sample followed by cavitation in different frequency such as 20 kHz, 40 kHz, 378 kHz, 574 kHz, 860 kHz, 992 kHz and 1.1 MHz. The cooling system was operated to maintain a constant temperature. The experiment was carried out with a sample volume of 100 mL held within a jacked glass cooling column.

Ozonation treatment of naptha diluted bitumen samples (400 ml) were carried out at different ozone doses from 50 g/l to 350 g/l and ozonation time (30 mins to 1.5 h).

Results are shown in Tables 5 and 6 below.

TABLE 5

Viscosity and density change in naptha diluted bitumen during AOPs

| | Viscosity (cP) | Density (g/cm3) |
|---|---|---|
| Unprocessed dilbit | 517.9 | 0.9831 |
| Cavitation process | | |
| 20 kHz | 378.5 | 0.9562 |
| 40 kHz | 364.1 | 0.9530 |
| 574 kHz | 341.9 | 0.9647 |
| 860 kHz | 445.2 | 0.9658 |
| 1125 kHz | 493.7 | 0.9652 |
| Ozonation treatment | | |
| O3 100 l/h | 516.9 | 0.9566 |
| O3 150 l/h | 621.7 | 0.9859 |
| O3 200 l/h | 567.3 | 0.9881 |
| O3 250 l/h | 587.9 | 0.9872 |
| O3 300 l/h | 638.1 | 0.9887 |
| Fenton's oxidation | | |
| $FeSO_4$—$H_2O_2$ | 400.8 | 0.9573 |
| $FeSO_4$—$H_2O_2$ | 401.5 | 0.9568 |
| $FeSO_4$—$H_2O_2$ | 417.1 | 0.9575 |
| $FeSO_4$—$H_2O_2$ | 425.7 | 0.9575 |
| $FeSO_4$—$H_2O_2$ | 432.9 | 0.9575 |
| Ferro-cavitation | | |
| 20 kHz - $FeSO_4$ | 305.1 | 0.9207 |
| 40 kHz - $FeSO_4$ | 290.5 | 0.9162 |
| 574 kHz - $FeSO_4$ | 302.6 | 0.9251 |
| 860 kHz - $FeSO_4$ | 376.9 | 0.9468 |
| 1125 kHz - $FeSO_4$ | 475.1 | 0.9576 |

TABLE 6

Change of mass of sample during ferro-cavitation and ozonation process

| | 20 kHz | 40 kHz | 574 kHz | 860 kHz | 1125 kHz |
|---|---|---|---|---|---|
| Ferro-cavitation conditions $FeSO_4$(ml) | 3.5 | 4.5 | 5.5 | 6.5 | 7.5 |
| Weight (g) jar + sample before run | 271.05 | 286.98 | 313.42 | 312.36 | 312.28 |
| Weight (g) jar + sample after run | 271.02 | 286.93 | 313.40 | 312.28 | 311.94 |
| Wt. loss (g) | 0.03 | 0.05 | 0.02 | 0.08 | 0.34 |
| Ozone dose | 100 l/h | 150 l/h | 200 l/h | 250 l/h | 300 l/h |
| Weight (g) jar + sample before run | 350.59 | 350.61 | 349.7 | 350.46 | 350.73 |
| Weight (g) jar + sample after run | 342.68 | 340.52 | 340.18 | 339.67 | 339.06 |
| Wt. loss (g) | 7.91 | 10.09 | 9.52 | 10.79 | 11.67 |

TABLE 7

Temperature variation in sample with time during 20 kHz and 40 kHz cavitation process

| 20 kHz | | 40 kHz | |
| --- | --- | --- | --- |
| Time (min) | T (° C.) | Time (min) | T (° C.) |
| 0 | 21.7 | 0 | 21.2 |
| 5 | 25.3 | 5 | 34 |
| 10 | 28.9 | 10 | 39 |
| 15 | 33.3 | 15 | 42.3 |
| 20 | 38.8 | 20 | 49 |
| 25 | 43.4 | 25 | 54 |
| 30 | 47.4 | 30 | 56.6 |
| 35 | 50.8 | 35 | 60.9 |
| 40 | 53.2 | 40 | 68 |
| 45 | 54.8 | 45 | 74.8 |
| 50 | 56 | 50 | 77 |
| 55 | 57 | 55 | 80 |
| 60 | 58 | 60 | 82 |

Fourier transform infrared spectrum (FTTR) was obtained in a Bruker Equinox-55 spectrophotometer using a KBr pellet with the scanning range from 400 cm$^{-1}$ to 4000 cm$^{-1}$. The $^1$H NMR was operated with a Varian-FT-80A spectrometer operating at 400 MHz. The main technical parameters were as follows: a flip angle of 45° and a repetition rate of 3 s. Deuterated DMSO (DMSO-d6) was used as solvent. Results are shown in Table 8 below.

TABLE 8

Hydrogen type ($^1$H-NMR data) in the asphaltene extracted from bitumen treated by AOPs

| | Hydrogen type | | | |
| --- | --- | --- | --- | --- |
| Sample | $H_A$ Chemical shift (ppm) (9.5-5.8) | $H\alpha$ Chemical shift (ppm) (4.5-1.9) | $H_\beta$ Chemical shift (ppm) (1.9-1.0) | $H\gamma$ Chemical shift (ppm) (1.0-0.4) |
| Unprocessed dilbit | 8.63 | 22.48 | 49.92 | 18.96 |
| Cavitation process | | | | |
| 20 kHz | 9.80 | 23.09 | 49.04 | 17.51 |
| 40 kHz | 7.91 | 20.12 | 52.89 | 19.08 |
| 574 kHz | 8.79 | 21.83 | 50.61 | 18.77 |
| 860 kHz | 9.54 | 22.51 | 49.64 | 18.31 |
| 1125 kHz | — | — | — | — |
| Ozonation treatment | | | | |
| O3 100 l/h | 7.90 | 22.20 | 50.88 | 19.03 |
| O3 150 l/h | 9.58 | 23.70 | 49.15 | 17.57 |
| O3 200 l/h | 9.33 | 23.87 | 49.18 | 17.62 |
| O3 250 l/h | 8.67 | 20.08 | 51.97 | 19.28 |
| O3 300 l/h | 9.61 | 22.79 | 49.88 | 17.71 |
| Fenton's oxidation | | | | |
| FeSO$_4$—H$_2$O$_2$ | 9.86 | 22.45 | 49.61 | 18.08 |
| FeSO$_4$—H$_2$O$_2$ | 9.77 | 22.26 | 50.27 | 17.70 |
| FeSO$_4$—H$_2$O$_2$ | 9.81 | 22.07 | 50.38 | 17.74 |
| FeSO$_4$—H$_2$O$_2$ | 9.37 | 22.20 | 50.84 | 17.58 |
| FeSO$_4$—H$_2$O$_2$ | 9.21 | 22.13 | 50.72 | 17.94 |
| Ferro-cavitation | | | | |
| 20 kHz-FeSO$_4$ | 9.17 | 25.73 | 53.91 | 18.01 |
| 40 kHz-FeSO$_4$ | 9.03 | 28.14 | 54.13 | 18.03 |
| 574 kHz-FeSO$_4$ | 9.65 | 22.35 | 49.94 | 18.06 |
| 860 kHz-FeSO$_4$ | 9.50 | 22.21 | 50.09 | 18.20 |
| 1125 kHz-FeSO$_4$ | — | — | — | — |

In these studies, different advanced oxidation processes (AOPs) such as cavitation process, ozonation, Fenton's oxidation, and ferro-cavitation processes were compared for the upgrading of bitumen heavy oil. Ferro-cavitation processes were carried out by using low to high sonication frequencies (20 kHz, 40 kHz, 378 kHz, 574 kHz, 860 kHz, and 1.1 MHz) over a range of input acoustic intensities followed by addition of iron sulfate in a sonochemical reactor system. The effect of AOPs on bitumen upgrading was carried out on the basis of asphaltene separation, change in rheology, and heavy metal removal. Ferro-cavitation treatment resulted in decreases the mass of asphaltene extracted from bitumen due to the disintegration and solubilisation of asphaltene flocs in the medium. Further, it was observed that ferro-cavitation treatment compared to other AOPs resulted in decrease in viscosity and shear stress with shear rate under the conditions tested. Greatest change was observed with sonication frequency of 40 kHz and 574 kHz with power input of 50%. Asphaltene content in bitumen plays a dominant role on its viscosity, and ferro-cavitation treatment of bitumen led to decrease in strong attractive interaction among the asphaltene particles, resulting decreases in viscosity and shear stress indicating shear thinning behavior.

Example 4—Acid-Leachate Treatment by AOPS and Ligands

In order to assess the effects of ferro-cavitation processes and ligand treatment on rare earth elements (REEs) concentration in acid leachate, a series of experiments were designed and performed as described below. Different AOPs such as cavitation processes, Fenton's oxidation, and ferro-cavitation treatment combined with ligand were carried out for the extraction of rare earth elements (Ce, Pr, Sm, Eu, Gd, Tb, Dy, Ho, Er, Lu, Hf, Ta, Tm and Yb) from weak acid leachate (WAL) and strong acid leachate (SAL) (see Tables 9 and 10). Experimental conditions for AOPs were carried out as described in connection with the results shown in Table 5. Analysis of the presence of REEs in acid leachate was carried out by using total reflection X-ray fluorescence (TXRF) and inductively coupled plasma mass spectrometer (ICP-MS) method. After treatment, extraction was carried out using a precipitation method. Rare earth elements were separated from other metals in acid leachate by precipitating them as oxalates with oxalic acid. Further, precipitation of sodium double sulphate hydrates (NaRE(SO$_4$)$_2$.xH$_2$O) through the addition of sodium sulphate was also used for the extraction of REEs from acid leachate.

TABLE 9

Concentration of rare earth elements (REEs) observed by ICP-MS method in acid leachate Concentration (µg/g)

| Sample | Ce (LRE) | Gd (LRE) | Pr (LRE) | Eu (LRE) | Sm (HRE) | Dy (HRE) | Ho (HRE) | Lu (HRE) | Yb (HRE) | Hf (HRE) | Ta (HRE) | Tb (HRE) | Tm (HRE) | Er (HRE) |
|---|---|---|---|---|---|---|---|---|---|---|---|---|---|---|
| WAL | | | | | | | | | | | | | | |
| Ligand | 0.36 | 0.14 | 0.24 | <LOQ | 0.2 | 0.18 | 0 | <LOQ | 0.02 | <LOQ | 0.03 | <LOQ | <LOQ | 0 |
| Ligand + cavitation (574 kHz) | 1.52 | 0.2 | 0.26 | <LOQ | 0.29 | 0.26 | 0.01 | <LOQ | 0.02 | 0.35 | 0.08 | <LOQ | <LOQ | 0.4 |
| Ligand + Fenton's oxidation | 1.5 | 0.2 | 0.26 | <LOQ | 0.26 | 0.26 | 0.01 | <LOQ | 0.02 | 0.35 | 0.07 | <LOQ | <LOQ | 0.4 |
| Ferro-cavitation + Ligand | 1.68 | 0.22 | 0.28 | <LOQ | 0.31 | 0.28 | 0.02 | <LOQ | 0.03 | 0.4 | 0.08 | <LOQ | <LOQ | 0.5 |
| Cavitation process (574 kHz) | 0.24 | 0.11 | 0.15 | <LOQ | 0.13 | 0.15 | 0 | <LOQ | 0.02 | <LOQ | 0.03 | <LOQ | <LOQ | 0 |
| SAL | | | | | | | | | | | | | | |
| Ligand | 0.41 | 0.16 | 0.26 | <LOQ | 0.22 | 0.21 | 0.01 | <LOQ | 0.03 | 0 | 0.03 | <LOQ | <LOQ | 0 |
| Ligand + cavitation | 1.52 | 0.22 | 0.28 | <LOQ | 0.27 | 0.28 | 0.02 | <LOQ | 0.03 | 0.33 | 0.08 | <LOQ | <LOQ | 0.4 |
| Ligand + Fenton's oxidation | 1.48 | 0.2 | 0.25 | <LOQ | 0.25 | 0.26 | 0.01 | <LOQ | 0.02 | 0.35 | 0.08 | <LOQ | <LOQ | 0.4 |
| Ligand + ferro-cavitation | 1.74 | 0.23 | 0.29 | <LOQ | 0.29 | 0.29 | 0.02 | <LOQ | 0.03 | 0.42 | 0.08 | <LOQ | <LOQ | 0.5 |
| Cavitation process (574 kHz) | 1.29 | 0.2 | 0.26 | <LOQ | 0.25 | 0.26 | 0.01 | <LOQ | 0.02 | 0.34 | 0.08 | <LOQ | <LOQ | 0.4 |
| Cavitation process (378 kHz) | 0.32 | 0.12 | 0.2 | <LOQ | 0.16 | 0.16 | 0 | <LOQ | 0.02 | <LOQ | 0.03 | <LOQ | <LOQ | 0 |
| Cavitation process (860 kHz) | 0.29 | 0.13 | 0.19 | <LOQ | 0.17 | 0.16 | 0 | <LOQ | 0.03 | <LOQ | 0.03 | <LOQ | <LOQ | 0 |

TABLE 10

Recovery (%) analysis of rare earth elements (REEs) from acid leachate

| Sample | Ce (LRE) | Gd (LRE) | Pr (LRE) | Sm (LRE) | Dy (HRE) | Yb (HRE) |
|---|---|---|---|---|---|---|
| WAL | | | | | | |
| Ligand | 85.2 | 86.3 | 83.1 | 84.5 | 87.1 | 94.3 |
| Ligand + cavitation | 67.9 | 23.3 | 17.7 | 21.1 | 23.7 | 15.9 |
| Ligand + Fenton's oxidation | 73.7 | 25.1 | 19.3 | 22.8 | 25.5 | 16.7 |
| Ligand + ferro-cavitation | 92.4 | 30.5 | 23.5 | 27.8 | 30.9 | 21.4 |
| Cavitation process (574 kHz) | 60.6 | 68.8 | 59.1 | 59.8 | 74.9 | 85.2 |
| SAL | | | | | | |
| Ligand | 77.3 | 71.1 | 63.8 | 76.6 | 64.0 | 55.0 |
| Ligand + cavitation | 76.1 | 23.5 | 16.6 | 23.0 | 21.7 | 10.5 |
| Ligand + Fenton's oxidation | — | 38.7 | 27.9 | 38.5 | 34.8 | 18.6 |
| Ligand + ferro-cavitation | 87.6 | 26.6 | 19.0 | 26.4 | 24.0 | 12.9 |
| Cavitation process (574 kHz) | 72.2 | 22.7 | 16.2 | 22.5 | 20.9 | 10.3 |
| Cavitation process (378 kHz) | 66.8 | 66.8 | 55.7 | 66.8 | 63.2 | 52.6 |
| Cavitation process (860 kHz) | 62.5 | 54.9 | 50.7 | 58.1 | 51.4 | 40.7 |

Experiments were carried out to compare the higher extraction of rare earth elements by using only EDTA, and EDTA in the presence of advanced oxidation processes. Without wishing to be bound by theory, results showed higher extraction in the presence of advanced oxidation processes, likely due to the production of hydroxyl radicals in the medium, which act as a hydroxide ligand.

Further, it was observed that the oxidation processes were more effective in SAL concentrate for extraction of rare earth elements as compared to WAL concentrate. These results are in agreement with other studies which showed that AOPs are more effective in acidic conditions with pH range of 2.5 to 4. Results indicate that, under the conditions tested, higher extraction of rare earth elements may be achieved using ligand technology, and enhancement may be obtained by adding different oxidation processes.

Example 5—Cavitation Versus Ferro-Cavitation Processes: Effects on Viscosity and Density of Naphtha Diluted Bitumen In order to assess the effects of cavitation and ferro-cavitation treatment on viscosity, density, and properties of asphaltene (elemental analysis and metal content) during bitumen upgrading, a series of experiments were designed and performed as described below. Viscosity, density, and properties of asphaltene were analyzed as described in Example 1. The experimental conditions for cavitation and ferro-cavitation are presented in Table 7. Ferro-cavitation processes followed the conditions used during cavitation treatment with addition of 0.75 g/L $FeSO_4 \cdot 7H_2O$.

TABLE 11

Effects of cavitation and ferro-cavitation treatment on viscosity and density of naphtha diluted bitumen

| | Power input (%) | Cavitation process | | Ferro-Cavitation process | |
|---|---|---|---|---|---|
| | | Viscosity, cP (viscosity change/initial viscosity, %) | Density (g/cm³) | Viscosity, cP (viscosity change/initial viscosity, %) | Density (g/cm³) |
| Unproc. sample | | 480 | 0.9584 | | |
| 378 kHz | 16.67 | 460 (95) | 0.9542 | 398 (82) | 0.9527 |
| | 33.33 | 410 (85) | 0.9538 | 379 (78) | 0.9518 |
| | 50 | 375 (78) | 0.9519 | 364 (75) | 0.9509 |
| | 66.67 | 368 (76) | 0.9500 | 338 (70) | 0.9471 |
| | 83.33 | 356 (74) | 0.9427 | 298 (62) | 0.9327 |
| 574 kHz | 16.67 | 416 (86) | 0.9539 | 391 (81) | 0.9523 |
| | 33.33 | 392 (81) | 0.9521 | 346 (72) | 0.9503 |
| | 50 | 341 (70) | 0.9358 | 328 (68) | 0.9283 |
| | 66.67 | 320 (66) | 0.9304 | 291 (60) | 0.9157 |
| | 83.33 | 305 (63) | 0.9261 | 247 (51) | 0.9013 |
| 860 kHz | 16.67 | 455 (94) | 0.9541 | 396 (82) | 0.9341 |
| | 33.33 | 421 (87) | 0.9539 | 369 (76) | 0.9301 |
| | 50 | 406 (84) | 0.9528 | 317 (66) | 0.9182 |
| | 66.67 | 380 (79) | 0.9514 | 310 (64) | 0.9027 |
| | 83.33 | 368 (76) | 0.9491 | 308 (63) | 0.9000 |
| 992 kHz | 16.67 | 465 (96) | 0.9556 | 428 (89) | 0.9547 |
| | 33.33 | 438 (91) | 0.9541 | 410 (85) | 0.9529 |
| | 50 | 412 (85) | 0.9538 | 402 (83) | 0.9510 |
| | 66.67 | 406 (84) | 0.9527 | 370 (77) | 0.9482 |
| | 83.33 | 394 (82) | 0.9524 | 340 (70) | 0.9401 |
| 1173 kHz | 16.67 | 476 (99) | 0.9582 | 457 (95) | 0.9559 |
| | 33.33 | 472 (98) | 0.9576 | 438 (91) | 0.9547 |
| | 50 | 449 (93) | 0.9542 | 427 (88) | 0.9479 |
| | 66.67 | 438 (91) | 0.9536 | 418 (87) | 0.9428 |
| | 83.33 | 421 (87) | 0.9529 | 394 (82) | 0.9410 |

TABLE 12

Effect of cavitation and ferro-cavitation treatment processes on elemental analysis of asphaltene samples

| | Power input (%) | Cavitation process | | Ferro-sonication process | |
|---|---|---|---|---|---|
| | | H/C | H/S | H/C | H/S |
| Unproc. sample | | 1.64 | 42.9157 | | |
| 378 kHz | 16.67 | 1.39 | 38.6460 | 1.31 | 32.2791 |
| | 33.33 | 1.41 | 38.5044 | 1.29 | 26.2419 |
| | 50 | 1.33 | 39.4380 | 1.26 | 25.1891 |
| | 66.67 | 1.28 | 35.5658 | 1.17 | 19.4728 |
| | 83.33 | 1.19 | 36.2104 | 1.13 | 17.1549 |
| 574 kHz | 16.67 | 1.28 | 35.7488 | 1.21 | 29.1562 |
| | 33.33 | 1.17 | 35.4875 | 1.14 | 24.2971 |
| | 50 | 1.02 | 27.9155 | 1.01 | 18.5427 |
| | 66.67 | 1.06 | 21.7923 | 1.00 | 17.2482 |
| | 83.33 | 1.03 | 21.7787 | 1.01 | 18.2964 |
| 860 kHz | 16.67 | 1.11 | 35.1270 | 1.07 | 32.7468 |
| | 33.33 | 1.12 | 30.4622 | 1.04 | 27.2891 |
| | 50 | 1.18 | 31.3309 | 1.01 | 24.1873 |
| | 66.67 | 1.32 | 36.2357 | 1.09 | 21.1786 |
| | 83.33 | 1.32 | 34.4198 | 1.27 | 20.8992 |
| 992 kHz | 16.67 | 1.37 | 35.3090 | 1.15 | 31.8916 |
| | 33.33 | 1.39 | 37.1917 | 1.29 | 26.9427 |
| | 50 | 1.42 | 39.1852 | 1.37 | 35.2871 |
| | 66.67 | 1.41 | 40.0085 | 1.39 | 38.2719 |
| | 83.33 | 1.47 | 40.5531 | 1.41 | 31.8716 |
| 1173 kHz | 16.67 | 1.35 | 34.1739 | 1.28 | 31.4781 |
| | 33.33 | 1.39 | 37.0552 | 1.26 | 26.2781 |
| | 50 | 1.10 | 30.5369 | 1.09 | 23.5819 |
| | 66.67 | 1.29 | 34.1673 | 1.12 | 29.4782 |
| | 83.33 | 1.30 | 34.6159 | 1.03 | 26.2475 |

Together, these results indicate that the ferro-cavitation treatment of bitumen under different conditions of frequency and power input decreased the H/C ratio in bitumen under the conditions tested. These results showed higher content of aromatic hydrogen and lower content of aliphatic hydrogen in bitumen treated under different conditions of sonication frequency and power inputs. Without wishing to be bound by theory, the increase in aromaticity in ferro-cavitation treatment was likely due to the dissolution and disintegration of asphaltene leading to breakage of side alkyl chains.

Example 6—Cavitation Versus Ferro-Cavitation Versus Ferro-Cavitation and Ligand Processes: Effects on Metals Recovery In order to assess the effects of cavitation, ferro-cavitation, and ferro-cavitation combined with ligand treatment on metals recovery from process-affected water of a tailings pond, a series of experiments were designed and performed as described below. The experimental conditions for the cavitation, ferro-cavitation, and ferro-cavitation combined with ligand is presented in Table 13. The analysis of metals in process-affected water was carried out by ICP-MS method.

TABLE 13

Effects of Cavitation, Ferro-Cavitation, and Ferro-Cavitation + Ligand Processes for Metal Recovery from Process-Affected Water

| | Power input (%) | Cavitation process (Metals Recovery, %) | | Ferro-cavitation process (Metals Recovery, %) | | Ferro-cavitation + Ligand (EDTA) (Metals Recovery, %) | |
|---|---|---|---|---|---|---|---|
| | | Ni | V | Ni | V | Ni | V |
| 378 kHz | 16.67 | 19.5 | 27.19 | 23.84 | 36.29 | 27.59 | 42.73 |
| | 33.33 | 24.8 | 36.58 | 29.57 | 43.52 | 32.81 | 48.17 |
| | 50 | 39.47 | 49.27 | 45.18 | 56.28 | 53.49 | 61.58 |
| | 66.67 | 43.71 | 52.33 | 49.72 | 59.21 | 56.27 | 65.19 |
| | 83.33 | 46.52 | 55 | 56.18 | 62.94 | 59.72 | 71.59 |
| 574 kHz | 16.67 | 23.47 | 34.18 | 28.59 | 39.51 | 32.74 | 34.81 |
| | 33.33 | 38.14 | 42.57 | 42.47 | 42.15 | 48.91 | 49.58 |
| | 50 | 49.27 | 54.29 | 53.29 | 59.18 | 59.17 | 72.08 |

TABLE 13-continued

Effects of Cavitation, Ferro-Cavitation, and Ferro-Cavitation + Ligand Processes for Metal Recovery from Process-Affected Water

|  | Power input (%) | Cavitation process (Metals Recovery, %) | | Ferro-cavitation process (Metals Recovery, %) | | Ferro-cavitation + Ligand (EDTA) (Metals Recovery, %) | |
|---|---|---|---|---|---|---|---|
|  |  | Ni | V | Ni | V | Ni | V |
|  | 66.67 | 53.71 | 68.91 | 58.34 | 65.18 | 67.21 | 76.19 |
|  | 83.33 | 61.93 | 70.57 | 65.92 | 71.18 | 69.34 | 79.0 |
| 860 kHz | 16.67 | 22.19 | 28.19 | 27.29 | 32.57 | 28.46 | 37.18 |
|  | 33.33 | 27.59 | 36.51 | 29.31 | 41.83 | 36.73 | 48.29 |
|  | 50 | 39.52 | 45.18 | 44.27 | 52.03 | 54.19 | 56.18 |
|  | 66.67 | 41.28 | 41 | 49.91 | 51.00 | 62.79 | 62.04 |
|  | 83.33 | 45.61 | 46.27 | 56.37 | 54.28 | 67.15 | 68.10 |
| 992 kHz | 16.67 | 19.46 | 29.57 | 25.37 | 23.18 | 36.81 | 29.46 |
|  | 33.33 | 24.82 | 17.29 | 29.91 | 28.12 | 42.19 | 34.59 |
|  | 50 | 41.83 | 38.24 | 49.56 | 32.57 | 56.12 | 43.81 |
|  | 66.67 | 35.17 | 46.71 | 52.19 | 51.27 | 58.24 | 60.28 |
|  | 83.33 | 38.49 | 36.52 | 44.21 | 50.94 | 61.72 | 63.10 |
| 1173 kHz | 16.67 | 17.28 | 25.18 | 23.37 | 19.84 | 32.19 | 29.37 |
|  | 33.33 | 15.0 | 34.59 | 28.19 | 24.79 | 37.04 | 36.72 |
|  | 50 | 20.71 | 39.27 | 23.47 | 35.18 | 24.97 | 49.72 |
|  | 66.67 | 24.18 | 42.10 | 19.4 | 36.91 | 28.13 | 44.90 |
|  | 83.33 | 21.07 | 45.0 | 18.21 | 38.24 | 25.49 | 38.29 |

Among the three treatment processes tested above (cavitation, ferro-cavitation, and ferro-cavitation combined with ligand separation), greatest removal of Ni and V from process-affected water was observed during the ferro-cavitation treatment combined with ligands separation.

Figure 11:
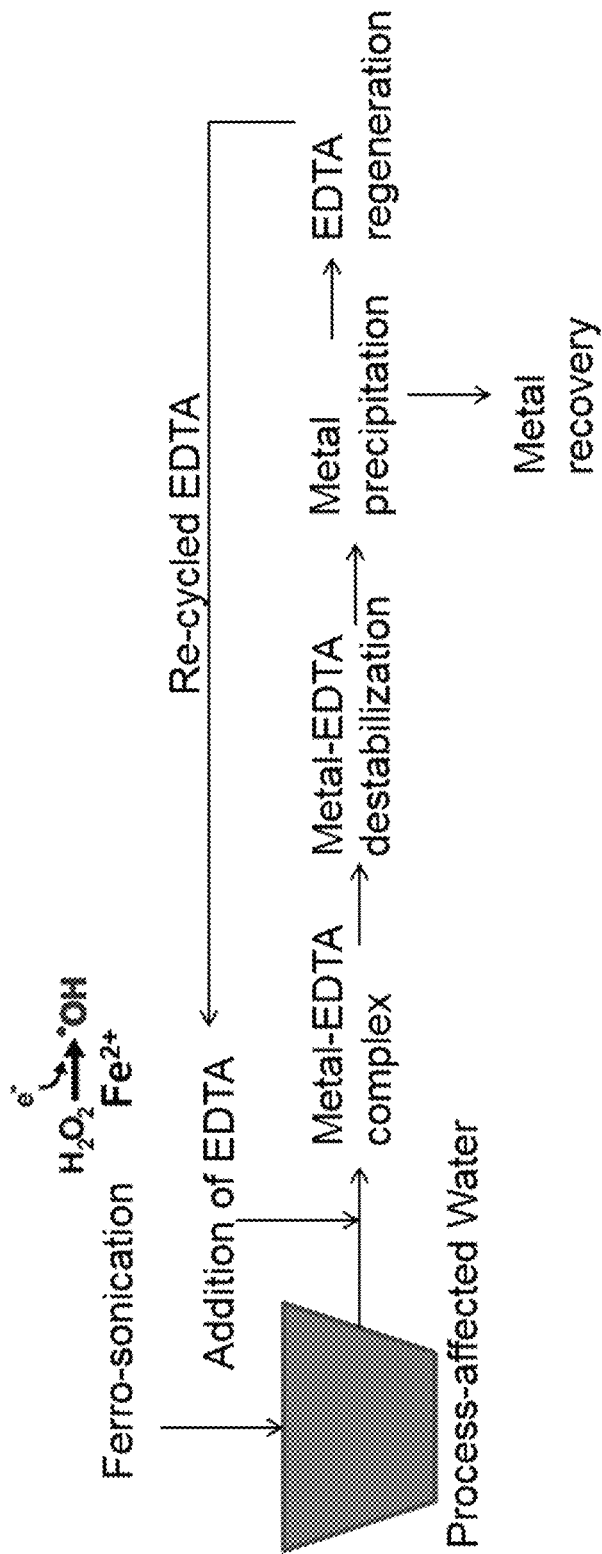
FIG. 11 shows an embodiment of a ferro-cavitation process for treating process-affected water which includes use of a ligand.

Example 7—Example of a Ferro-Cavitation Process, Including Optional Ligand Addition, for Nickel (Ni) Recovery from a Process-Affected Water Sample FIG. 11 depicts an illustrative embodiment of a ferro-cavitation process, including an optional ligand addition step, for treating a process-affected water sample to separate and recover a target metal (in this case, nickel (Ni)).

In this illustrative and non-limiting embodiment, an oil sands process-affected water liquid sample containing nickel is subjected to ferro-cavitation, wherein an iron (II) salt (in this example, $FeSO_4$) is added to the liquid sample and allowed to react via Fenton's oxidation reaction with the hydrogen peroxide contained in the sample to generate hydroxyl radicals (and other oxygen radicals), while the liquid sample is simultaneously subjected to sonication (i.e. acoustic cavitation) in the range of 500-800 kHz.

Following ferro-cavitation as described above, a tetradentate ligand is added to the liquid sample. In this example, the ligand is EDTA, which is added following ferro-cavitation. It is contemplated that ligand addition may be performed before, during, or after ferro-cavitation, or any combination thereof. The added EDTA complexes with the nickel, forming, for example, Nickel (II) EDTA complex (for example, $C_{10}H_{14}N_2NiO_8$ and/or other complexes as shown in Miletic et al., *Inorganic Chemistry Comm. J.* 12 (2009) 720-723; herein incorporated by reference in its entirety), present in the liquid sample. Metal-EDTA complex can be reduced using sulfide or other reducing agents to precipitate out Ni, further assisting with metal extraction. The metal-EDTA complex is subsequently destabilized, resulting in precipitation of the nickel, which is subsequently recovered. The remaining EDTA is regenerated, and re-used in this illustrative example. The resulting treated liquid sample, having reduced metals content, may now be re-used, if desired.

It is contemplated here that other metals or metalloids may be extracted in a similar manner. For example, Se may be extracted. In certain embodiments, selenium extraction may employ a 2-(aminomethyl)pyridine ligand. Selenium dioxide produced in the liquid sample can react with 2-(aminomethyl)pyridine, leading to the formation of an imidazo [1,5-α]pyridine (2-azaindolizine) skeleton in a single step. Major products of such reactions are 3-(2-pyridyl)imidazo [1,5-α]pyridine, bis[3-(2-pyridyl)imidazo[1,5-α]pyridin-1-yl] selenide, or the corresponding diselenide that can be separated as a solid. Chemical structures of such complexes are described in *J. Am. Chem. Soc.*, 2005, 127(10), pp 3290-3291, herein incorporated by reference in its entirety.

Example 8—Removal of Inorganic Pollutants from Water in the Mining Industry

In this work, the focus was on examining the removal of inorganic contaminants in minewater. In particular, ferro-cavitation was evaluated for metallurgical coal and gold industry for selenium removal from mine water.

In this Example, effluent samples similar to typical metallurgical coal effluents were processed using ferrocavitation and benchmarked against other advanced oxidation processes. The effluent volume was 200 mL for each experiment.

Results set out in Table 14 below are organized as effluent by treatment with cavitation only (sample S1 to S3); Fenton Oxidation (S4 and S8); and Ferrocavitation at high (S5) and low pH (S9 & S10).

In this example, the sample, named "Effluent", was selected to have a nitrate and total selenium loading similar to that found in metallurgical coal effluent waters. The total selenium was analyzed using malachite green indicator as a preliminary test and further analyzed by ICP-MS using O. Reg. 153(511) to determine metals (Including Hydrides) in the water (effluent). Results shown in S5, S9 and S10 (marked in underlining) show the selenium removal efficiency at ~50% in process condition 510.

TABLE 14

Selenium removal at low concentrations typically found in the metallurgical coal industry

| Sample tag/name | Process operating conditions | Total selenium UV-VIS (mg/L) | ICP-MS (mg/L) | COD mg/L | Ammonia mg/L |
|---|---|---|---|---|---|
| Blank | Standard double distilled water 400 ppb | | 0.398 | | |
| Effluent/Feed water | Effluent Water - Metallurgical Coal Industry | 0.5961 | 0.487 | 89.6 | 3.04 |
| S1-CAV | Oxidation treatment with frequency of 574 kHz, power input 50%, sonication time 30 min | 0.4843 | 0.420 | — | 2.6 |
| S2-CAV | Oxidation treatment with frequency of 40 kHz, amplitude 50%, sonication time 1 hour | 0.4902 | 0.416 | 72 | 2.36 |
| S3-CAV | Oxidation treatment with frequency of 20 kHz, amplitude 80%, sonication time 1 hour | 0.3676 | 0.390 | 67.2 | 2.89 |
| S4-H2O2 | Oxidation treatment by adding 1 ml $H_2O_2$, 0.2 g $FeSO_4 \cdot 7H_2O$, pH 7.6, shaking for 1 h at 200 rpm | 0.3524 | 0.392 | 80 | 2.79 |
| S5-FERRO-CAV | Ferro-cavitation oxidation treatment with addition of 0.2 g $FeSO_4 \cdot 7H_2O$, pH 7.6 with frequency of 40 kHz, power input 80%, sonication time 1 hour, sample volume 350 mL | <u>0.3473</u> | <u>0.364</u> | <u>81.6</u> | <u>2.08</u> |
| S8-H2O2 | Oxidation treatment by adding 1 ml $H_2O_2$, 0.2 g $FeSO_4 \cdot 7H_2O$, pH (2.5-3.5), shaking for 1 h at 200 rpm, sample volume 350 mL | 0.5127 | 0.447 | 73.6 | 3.48 |
| S9-FERRO-CAV | Ferro-cavitation oxidation treatment with addition of 0.2 g $FeSO_4 \cdot 7H_2O$, pH(2.5-3.5) with frequency of 40 kHz, power input 80%, sonication time 1 hour, sample volume 350 mL | <u>0.4931</u> | <u>0.430</u> | <u>72</u> | <u>3.47</u> |
| S10-FERRO-CAV | Ferro-cavitation oxidation treatment with addition of 0.2 g $FeSO_4 \cdot 7H_2O$, pH(2.5-3.5) with frequency of 20 kHz, power input 80%, sonication time 1 hour, sample volume 300 mL | <u>0.3128</u> | <u>0.357</u> | <u>72</u> | <u>2.76</u> |

Effluent samples similar to metallurgical coal effluents were further examined using Ferrocavitation with the addition of 10 mg of EDTA (ligand) and benchmarked against other advanced oxidation processes. Effluent volume was 200 mL for each experiment.

The data in Table 15 below are organized as effluent by treatment with cavitation and ligand addition only (sample S1 to S3); Fenton Oxidation with ligand addition (S4 and S8); and Ferrocavitation with ligand addition at high (S5) and low pH (S9 & S10).

In this example, the sample, named "Effluent", was selected to have a nitrate and total selenium loading similar to that found in metallurgical coal effluent waters. The total selenium was analyzed using malachite green indicator as a preliminary test and further analyzed by CP-MS using O. Reg. 153(511) to determine metals (Including Hydrides) in the water (effluent). Results shown in S5, S9 and S10 (marked in underlining) show the selenium removal efficiency at ~50% in process condition S10.

TABLE 15

Selenium removal at low concentrations typically found in the metallurgical coal industry using Ferrocavitation with addition of EDTA as ligand

| Sample name | Process operating conditions | Total selenium UV-VIS | ICP-MS (mg/L) | COD mg/L | Ammonia mg/L |
|---|---|---|---|---|---|
| Blank | Standard double distilled water 400 ppb | 0.4 | 0.398 | | |
| Effluent/Feed water | Effluent Water - Metallurgical Coal Industry | 0.5928 | | 99.6 | 3.04 |
| S1-CAV-LIG | Oxidation treatment with frequency of 574 kHz, power input 50%, sonication time 30 min with the addition of 0.10 g EDTA (ligand) | — | — | — | 2.6 |
| S2-CAV-LIG | Oxidation treatment with frequency of 40 kHz, amplitude 50%, sonication time 1 hour; with the addition of 0.10 g EDTA (ligand) | 0.4217 | | 72 | 2.36 |

TABLE 15-continued

Selenium removal at low concentrations typically found in the metallurgical coal industry using Ferrocavitation with addition of EDTA as ligand

| Sample name | Process operating conditions | Total selenium UV-VIS | Total selenium ICP-MS (mg/L) | COD mg/L | Ammonia mg/L |
|---|---|---|---|---|---|
| S3-CAV-LIG | Oxidation treatment with frequency of 20 kHz, amplitude 80%, sonication time 1 hour; with the addition of 0.10 g EDTA (ligand) | 0.3185 | | 67.2 | 2.89 |
| S4-FENTON-LIG | Oxidation treatment by adding 1 ml $H_2O_2$, 0.2 g $FeSO_4 \cdot 7H_2O$, pH 7.6, shaking for 1 h at 200 rpm; with the addition of 0.10 g EDTA (ligand) | 0.3429 | | 80 | 2.79 |
| S5-FERRO-CAV-LIG | Ferro-cavitation oxidation treatment with addition of 0.2 g $FeSO_4 \cdot 7H_2O$, pH 7.6 with frequency of 40 kHz, power input 80%, sonication time 1 hour, sample volume 350 mL with the addition of 0.10 g EDTA (ligand) | 0.3057 | | 81.6 | 2.08 |
| S8-FENTON-LIG | Oxidation treatment by adding 1 ml $H_2O_2$, 0.2 g $FeSO_4 \cdot 7H_2O$, pH (2.5-3.5), shaking for 1 h at 200 rpm, sample volume 350 mL with the addition of 0.10 g EDTA (ligand) | 0.2910 | | 73.6 | 3.48 |
| S9-FERRO-CAV | Ferro-cavitation oxidation treatment with addition of 0.2 g $FeSO_4 \cdot 7H_2O$, pH(2.5-3.5) with frequency of 40 kHz, power input 80%, sonication time 1 hour, sample volume 350 mL with the addition of 0.10 g EDTA (ligand) | 0.2058 | | 72 | 3.47 |
| S10-FERRO-CAV | Ferro-cavitation oxidation treatment with addition of 0.2 g $FeSO_4 \cdot 7H_2O$, pH(2.5-3.5) with frequency of 20 kHz, power input 80%, sonication time 1 hour, sample volume 300mL with the addition of 0.10 g EDTA(ligand) | 0.2473 | | 72 | 2.76 |

Additional Selenium removal experiments were performed at high Selenium concentrations such as those typically found in precious metal effluents. Results are shown in Table 16 below.

TABLE 16

Selenium removal at high selenium concentrations typically found in precious metal effluents

| Sample name | Process operating conditions | Total selenium UV-VIS | Total selenium ICP-MS (mg/L) |
|---|---|---|---|
| Blank | Standard double distilled water 400 ppb | 0.4 | 0.398 |
| Effluent/Feed water | Effluent Water - Precious Metal Refining Operation | | 10 |
| S10-FERRO-CAV | Ferro-cavitation oxidation treatment with addition of 0.2 g $FeSO_4 \cdot 7H_2O$, pH(2.5-3.5) with frequency of 20 kHz, power input 80%, sonication time 1 hour, sample volume 300 mL with the addition of 0.10 g EDTA (ligand) | | 2.7 |

During gold extraction and processing, selenium is dissolved in the process water and results in high concentrations of Selenium contamination in process waters (typically ranging from 1-10 ppm Se). Gold effluent mine water from a refining operation was processed using ferrocavitation with EDTA as a ligand and the results show a reduction from 10 ppm to 2.7 ppm.

Example 9—Removal of Organic Contaminants (Persistent Organic Polymers (POPs) and Perfluorooctane Sulfonate (PFOS) Contaminant Removal from Effluent Water Samples Per- and polyfluoroalkyl substances (PFAS) are a diverse group of compounds resistant to heat, water and oil. These chemicals are persistent, and resist degradation in the environment. They also bioaccumulate that results in increases over time in blood and organs. These experiments were designed to address PFOS removal from water as the compounds due to their bioaccumulation characteristics.

In this Example, an embodiment of a Ferro-cavitation process was benchmarked with cavitation treatment to examine the potential to remove PFOS contamination from water. In this application a known concentration of PFOS (1 ppm and 10 ppm nominal) was doped in double distilled water and subjected to ferrocavitation. The data below details the experimental conditions and associated results from cavitation and ferro-cavitation without ligand addition as the process requireds the removal/degradation of organics in water.

Experimental Conditions

R1: Cavitation treatment with frequency of 40 kHz, amplitude 80%, sonication time 3 hour for 1 ppm sample and 2 hours for 10 ppm one, sample volume 250 mL.

R2: Cavitation treatment with frequency of 20 kHz, amplitude 80%, sonication time 2 hour, sample volume 250 mL.

R4: Ferro-cavitation oxidation treatment with addition of 0.2 g $FeSO_4 \cdot 7H_2O$, with frequency of 40 kHz, power input 80%, sonication time 2 hour, sample volume 250 mL.

R5: Ferro-cavitation oxidation treatment with addition of 0.2 g FeSO₄.7H₂O, with frequency of 20 kHz, power input 50%, sonication time 2 hour, sample volume 250 mL.

* The prefix 1 or 10 in the following results tables indicates the ppm of PFOS in distilled water.

** 1-raw refers to doped double distilled water sample at 1 ppm or 100 ppm PFOS concentrations.

Results:

Experimental results are set out in Tables 17-19 below.

TABLE 17

Temperature of the water at the end of the experiment

| Sample Number | Concentration | Final temperature ° C. |
|---|---|---|
| R1 | 1 ppm | 65 |
|  | 10 ppm | 70 |
| R2 | 1 ppm | 70 |
|  | 10 ppm | 71 |
| R4 | 1 ppm | 67 |
|  | 10 ppm | 65 |
| R5 | 1 ppm | 55 |
|  | 10 ppm | 67 |

TABLE 18

PFOS total (PFOS and PFHpS) and Fluoride (F-) found in aqueous samples treated by hydrodynamic cavitation. Nominal PFOS concentration was 1 mg/L.

| ID | PFOS (mg/L) | Fluoride (V) (mg/L) |
|---|---|---|
| 1-raw | 0.38 | 0 |
| 1-R1 | 0.09 | 0.083 |
| 1-R2 | 0.53 | 0.029 |
| 1-R4 | 0 | 0 |
| 1-R5 | 0 | 0 |

TABLE 19

PFOS Total (PFOS and PFHpS) and Fluoride (F-) found in aqueous samples treated by hydrodynamic cavitation. Nominal PFOS concentration was 10 mg/mL.

| ID | PFOS (mg/L) | Fluoride (F-) (mg/L) |
|---|---|---|
| 10-raw | 8.43 | 0 |
| 10-S1 | 7.59 | 0.312 |
| 10-S2 | 7.31 | 0.103 |
| 10-S4 | 4.06 | 0.320 |
| 10-S5 | 3.87 | 0.140 |

One or more illustrative embodiments and examples have been described herein by way of non-limiting example. It will be understood to persons skilled in the art that examples and embodiments provided herein are intended to be illustrative and non-limiting. The skilled person having regard to the teachings herein will recognize that a number of variations and modifications may be made without departing from the scope of the invention as defined in the claims.

What is claimed is:

1. A process for removal of a target metal from a liquid sample, said process comprising:
applying acoustic cavitation to the liquid;
adding an iron (II) salt, or a precursor form thereof, to the liquid sample and allowing Fenton oxidation reaction to occur between the iron and hydrogen peroxide in the liquid, thereby producing hydroxyl radicals; and
adding a ligand for the target metal to the liquid sample after the application of acoustic cavitation has ended;
thereby producing a target metal salt or metal oxide having a reduced solubility in the liquid sample, leading to removal of the target metal from the liquid sample.

2. The process according to claim 1, wherein the process further leads to removal of target organic compounds from the liquid sample.

3. The process according to claim 2, wherein the target organic compounds comprise persistent organic polymers (POPs).

4. The process according to claim 3, wherein the POPs comprise perfluorooctane sulfonate (PFOS), perfluoroheptane sulfonate (PFHpS) or other Per- or polyfluoroalkyl substance (PFAS).

5. The process according to claim 1, wherein the acoustic cavitation is in a range of from 20 kHz to 2.4 MHz, or from 350 kHz to 800 kHz, or from 500-600 kHz.

6. The process according to claim 1, wherein the liquid sample is or comprises a process affected water, an oil, a bitumen, or an asphaltenes.

7. The process according to claim 1, wherein the target metal is nickel (Ni), vanadium (V), or selenium (Se).

8. The process according to claim 1, wherein the iron (II) salt is FeSO4.

9. The process according to claim 1, wherein the target metal salt or metal oxide having reduced solubility in the liquid sample is precipitated from the liquid sample and removed therefrom.

10. The process according to claim 1, wherein the ligand complexes with the target metal, thereby further reducing solubility of the metal in the liquid sample, facilitating removal therefrom.

11. The process according to claim 10, wherein complexation of the ligand with the metal results in precipitation of the metal from the liquid sample.

12. The process according to claim 1, wherein the ligand is EDTA.

13. The process according to claim 1, wherein the target metal is selenium.

14. The process according to claim 13, wherein selenium complexes with the ligand to form at least one complex having the structure:

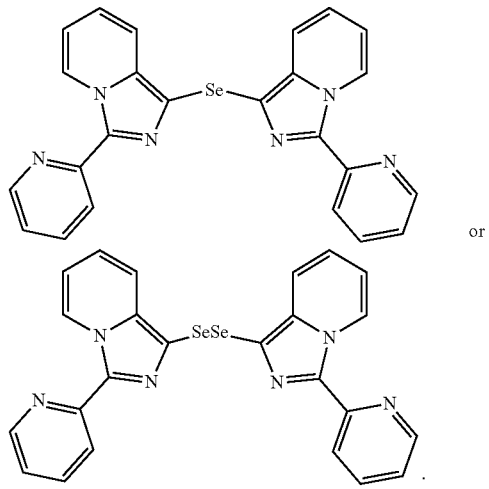

or

15. The process according to claim 1, wherein no additional hydrogen peroxide is added to the liquid as part of the process.

16. The process according to claim 1, wherein the hydrogen peroxide is generated in the liquid sample when acoustic cavitation is applied thereto.

17. A process for upgrading bitumen, said process comprising:
applying acoustic cavitation to the bitumen;
adding an iron (II) salt, or a precursor form thereof, to the bitumen and allowing Fenton oxidation reaction to occur between the iron and hydrogen peroxide in the bitumen,
thereby producing hydroxyl radicals; and
adding a ligand for the target metal to the liquid sample after the application of acoustic cavitation has ended.

18. A process for removal of an organic contaminant from a liquid sample, said process comprising:
applying acoustic cavitation to the liquid sample;
adding an iron (II) salt, or a precursor form thereof, to the liquid sample and allowing Fenton oxidation reaction to occur between the iron and hydrogen peroxide in the liquid sample, thereby producing hydroxyl radicals; and
adding a ligand for the target metal to the liquid sample after the application of acoustic cavitation has ended.

19. The process according to claim 5, wherein the acoustic cavitation is in a range of from 350 kHz to 800 kHz.

20. The process according to claim 5, wherein the acoustic cavitation is in a range of from 500-600 kHz.

* * * * *